July 5, 1949.  C. R. DOTY  2,475,315
RECORD VERIFYING MACHINE
Filed Dec. 12, 1944  8 Sheets-Sheet 1
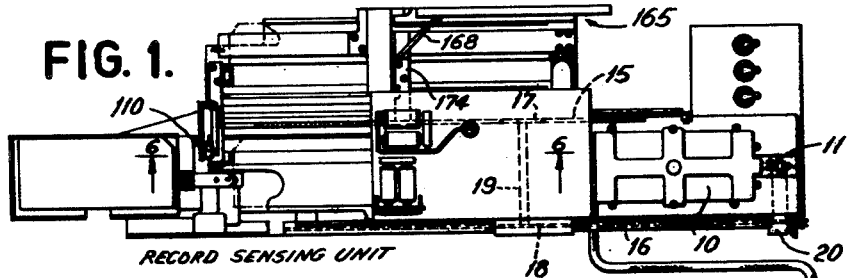
FIG. 1.
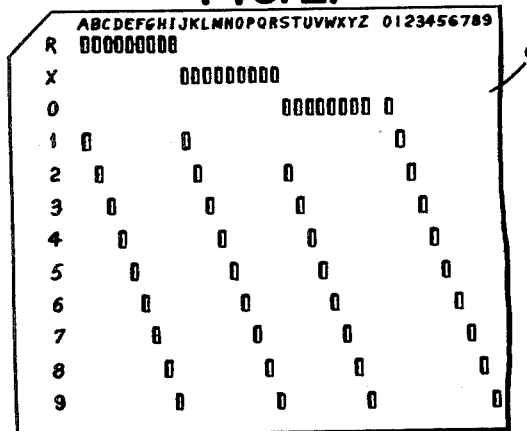
FIG. 2.
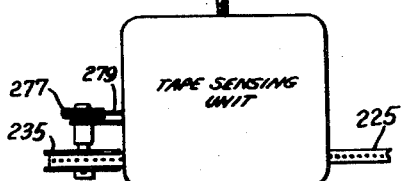
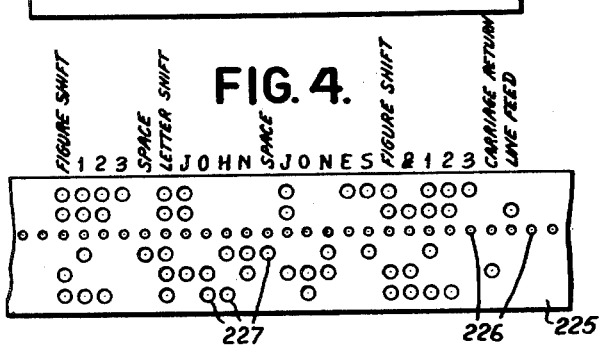
FIG. 3.
FIG. 4.
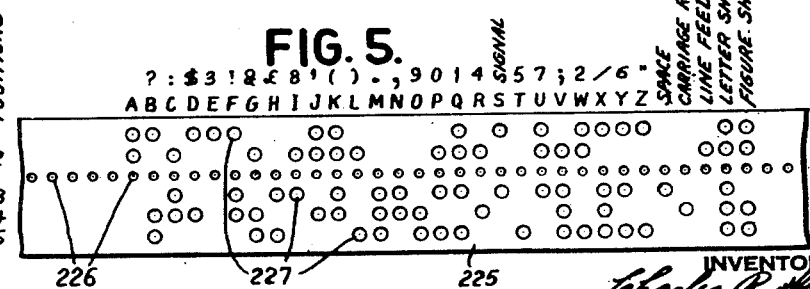
FIG. 5.
INVENTOR
Charles R. Doty
BY
ATTORNEY

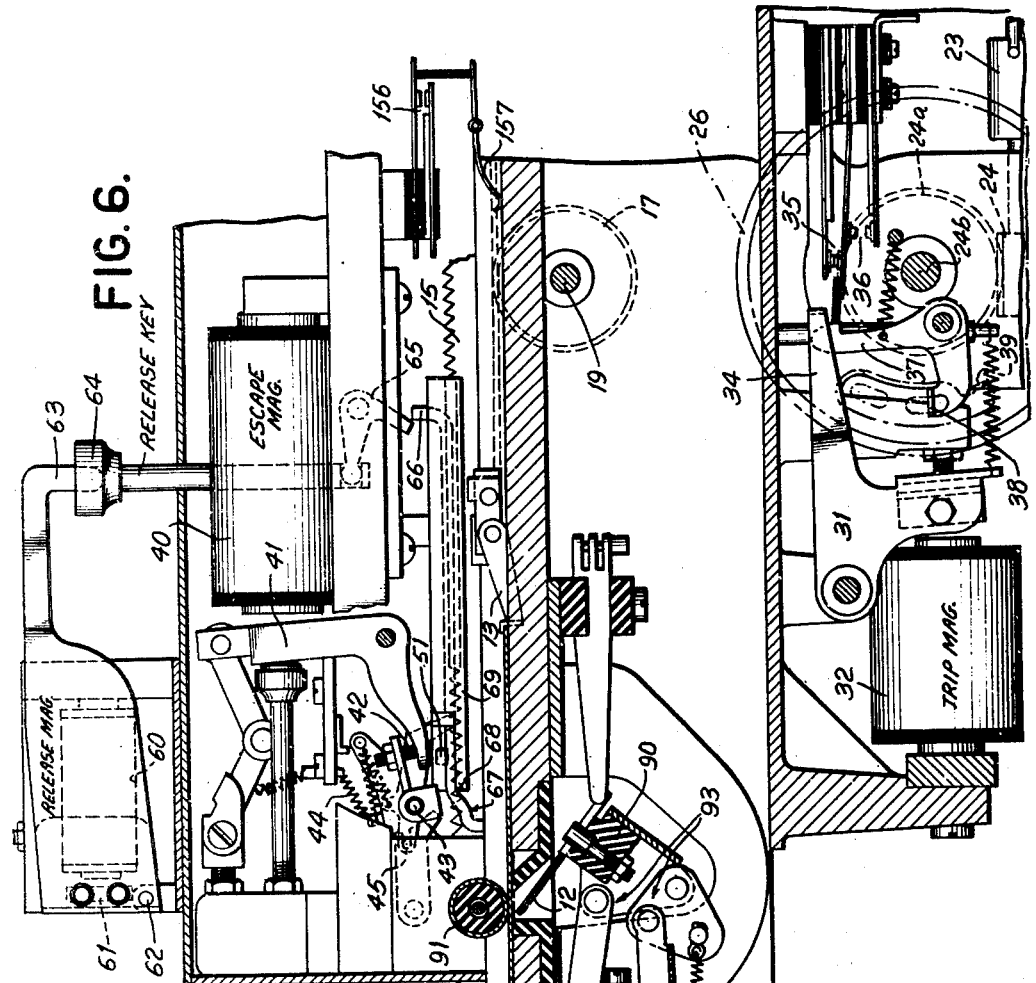

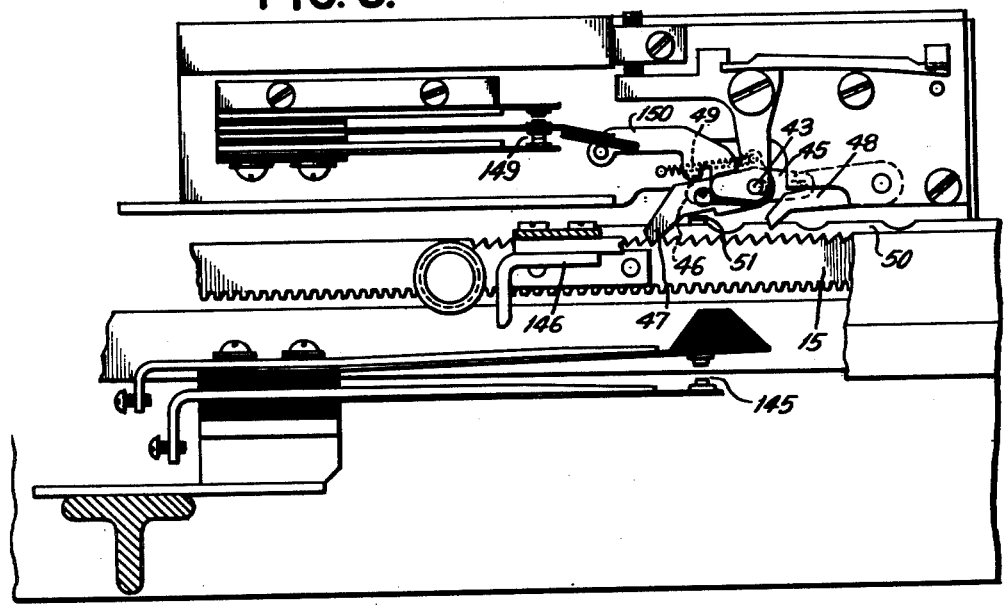
FIG. 8.
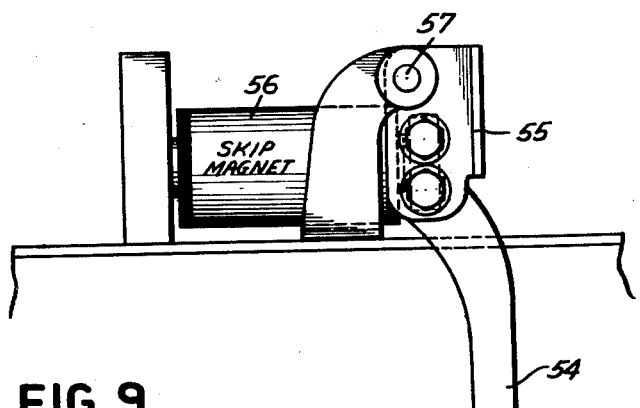
FIG. 9.
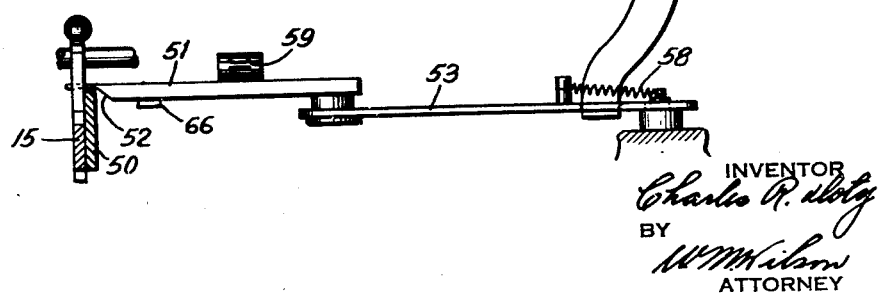

July 5, 1949. C. R. DOTY 2,475,315
RECORD VERIFYING MACHINE
Filed Dec. 12, 1944 8 Sheets-Sheet 4

INVENTOR
Charles R. Doty
BY
W. M. Wilson
ATTORNEY

July 5, 1949.  C. R. DOTY  2,475,315
RECORD VERIFYING MACHINE
Filed Dec. 12, 1944  8 Sheets-Sheet 6

INVENTOR
Charles R. Doty
BY
W. W. Wilson
ATTORNEY

Patented July 5, 1949

2,475,315

UNITED STATES PATENT OFFICE 2,475,315

RECORD VERIFYING MACHINE

Charles R. Doty, Yonkers, N. Y., assignor to International Business Machines Corporation, New York, N. Y., a corporation of New York Application December 12, 1944, Serial No. 567,865

14 Claims. (Cl. 73—156)

This invention relates to verifying machines employed in the verification of perforated record materials which are supposedly alike in their data representations and more particularly to improvements in devices of this class which are automatic in operation.

The two record materials which are to be compared or verified are distinct in their code of data representing designations and one consists of a record card perforated in statistical code for use in controlling accounting machines and the other comprises a tape perforated according to a five unit Baudot or telegraphic code used for telegraphic transmission. The tape may be perforated under control of a record card to represent like data, or the record card may be perforated under control of the tape to represent like data, either according to the requirements. The prior art discloses machines which are capable of doing either job. Patent No. 2,340,800, issued to C. R. Doty, patented February 1, 1944, discloses a machine wherein a record card is sensed to control a telegraphic tape perforating unit. Patent No. 2,340,801, issued to C. R. Doty, patented February 1, 1944, discloses the opposite type of machine wherein a tape is sensed to control the perforating of a card in a statistical code. In either machine the product, whether it is a tape or record card, is supposedly perforated to represent data on the master card, although the data may be represented on the different records in a different code. The present invention relates to a verifying machine which checks the accuracy of the product whether it is a tape or record card by indirectly comparing the holes punched in the tape with the holes punched in the tabulating card.

In view of the fact that the data is represented in both the master record and the product record in different codes, it is not possible to verify the data representations on the two record materials by directly comparing the presence of the same perforations and it is, therefore, a broad object of the invention to provide a verifying or checking device which verifies corresponding data representing columns of two record materials which represents the same data in different codes.

A more specific object of the invention is to sense one of the record materials and translate and convert its data representation to a coded representation which corresponds to the coding of the other record material.

A still further object of the invention is to provide an automatically operated verifying machine which will automatically function to compare and verify corresponding card columns of two record materials representing the same data in different codes and to suspend the verifying operation when agreement is not found in data representations of corresponding columns.

A still further object of the invention is to effect means to automatically space both record materials to the next column each time that the above described verifying or checking devices find agreement in data representations of corresponding columns.

A still further object of the invention is to provide a signal means controlled by the above described verifying device which is operative upon the detection of an error to suspend further verifying operations of the machine.

Another object of the invention is to suspend or render inoperative the verifying or checking devices and the feeding means for the card whenever the sensing unit for the tape senses an interpolated designation which does not have a corresponding designation in the record card.

As an example of the necessity for such interpolated designations it is stated that when such telegraphic tapes are utilized to control tape-controlled typewriters or tape-controlled printing machines, certain functional signals are interspersed on the tape, such signals being, for example, "figure shift," "letter shift," "carriage return," "line feed," etc., all of which control various functional operations of the printing machine. Obviously, since the record cards are utilized to control accounting machines, corresponding designations are not found on the card. Hence, in the present verifying machine the objective in this respect, namely, suspension of verifying operations, is effective when such designations are encountered.

The specific embodiment of the invention serves as one illustrative form of the invention and comprises a suitable record card sensing unit, wherein each card is advanced to present successively the columns of alphabetical and numerical data designations to individual sensing elements. It also includes a suitable tape sensing unit wherein columns of the tape are successively presented to tape sensing means.

The code of the designations on the tape are according to the so-called Baudot or telegraphic code and groups of translating and distributing relays are selectively controlled by the tape sensing means to translate or convert the Baudot code to a Hollerith code for direct comparison with a setup under control of the statistical card. The machine includes verifying circuits by means of which the converted and translated designation is compared with the data designation on the card and the completion of the verifying circuit is made upon an agreement in data designations and the machine then automatically operates to feed the tape and concomitantly the record card to the next or corresponding columns.

A still further object of the invention is to suspend verifying operations upon sensing key signal or code "letters or figures shift," depending upon which character group (alphabetical or numerical) the sensed data is related to and to condition the circuits so that a proper setup for verification is made of such data.

The herein described construction is distinguished by a machine which is automatically operated for comparison of data representing designations on two compared record materials, which data are represented thereon in different codes and carries out verifying operations in an automatic sequence without the attention of the operator giving, however, a distinct signal to the operator whenever an error has been detected. By employment of the present machine the accuracy of the product of the machine previously used as a master or pattern to perforate either a product record or a product tape can be checked, insuring that when such product record material is used for its purpose the accuracy of the result will be insured.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of the verifying apparatus showing at the top the card sensing unit and below the tape sensing unit connected to the first machine by a cable.

Fig. 2 is a portion of a statistical card showing the code of perforations for representing alphabetical characters and the numerals.

Fig. 3 is a fragment of a card whose punching is to be verified.

Fig. 4 is a portion of a tape bearing an exemplary message which is perforated in a code different from the statistical card and which is to be compared with the card for verification in data designation in corresponding card columns.

Fig. 5 is a fragment of a tape showing the code of perforations representing data such as characters, numerals, punctuation and special functional designations in a combinational Baudot code.

Fig. 6 is a sectional view of the record card sensing machine.

Fig. 7 is a detail showing the clutch connection between the card carriage mechanism and the driving motor.

Fig. 8 is a detail of the card carriage escapement mechanism.

Fig. 9 is a detail of the skip magnet and the carriage skipping mechanism controlled thereby.

Figure 16A:
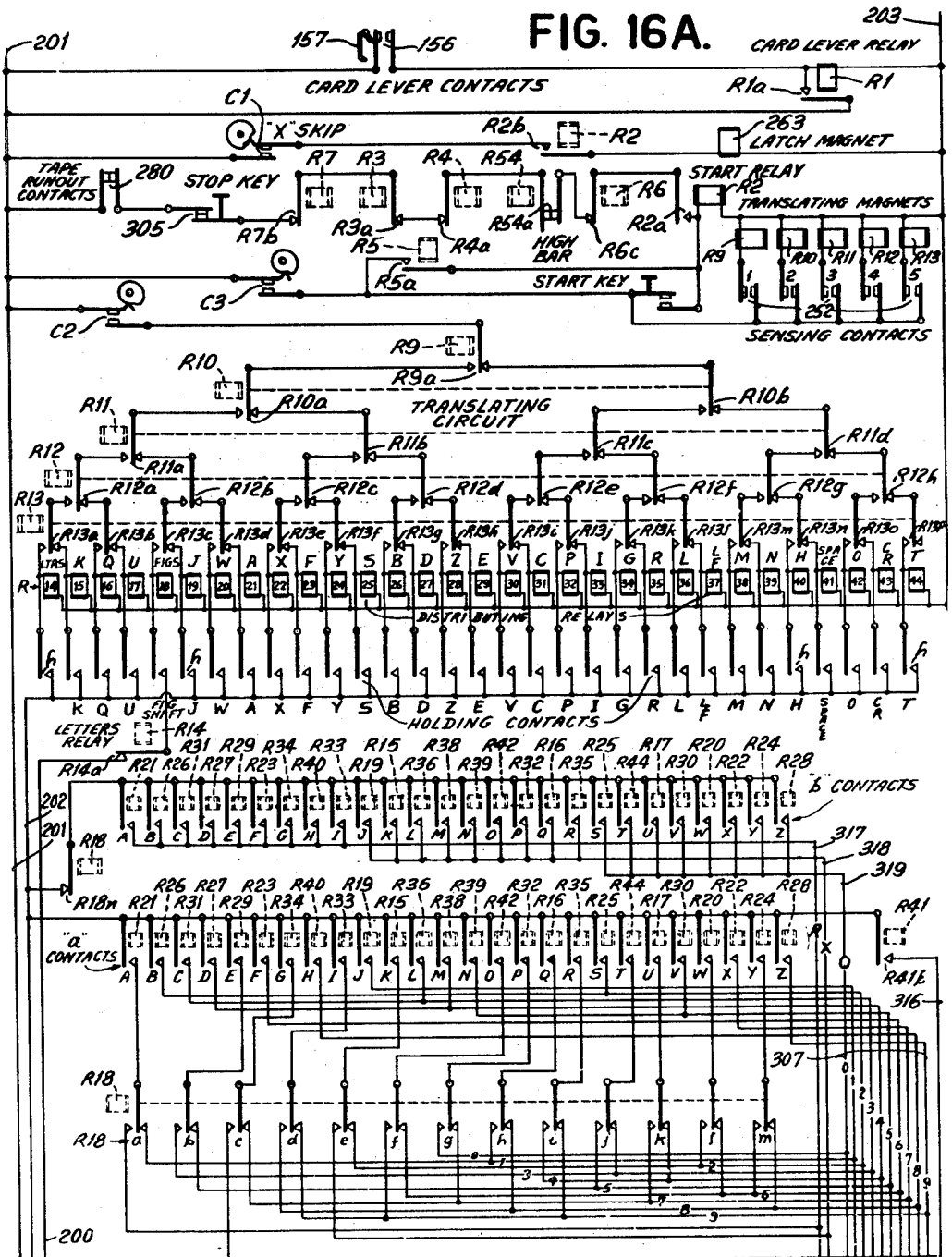
Figure 16B:
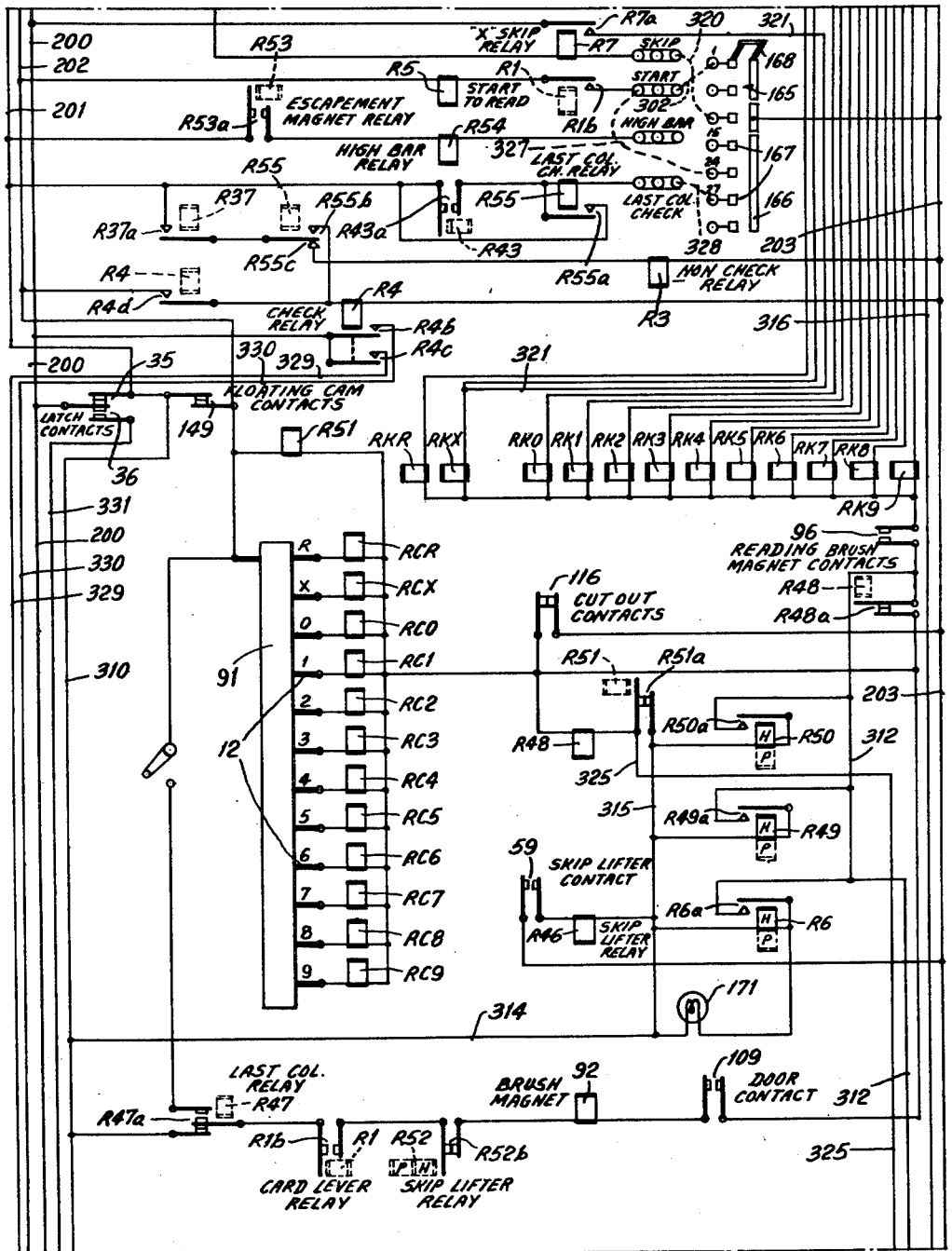
Figure 16C:
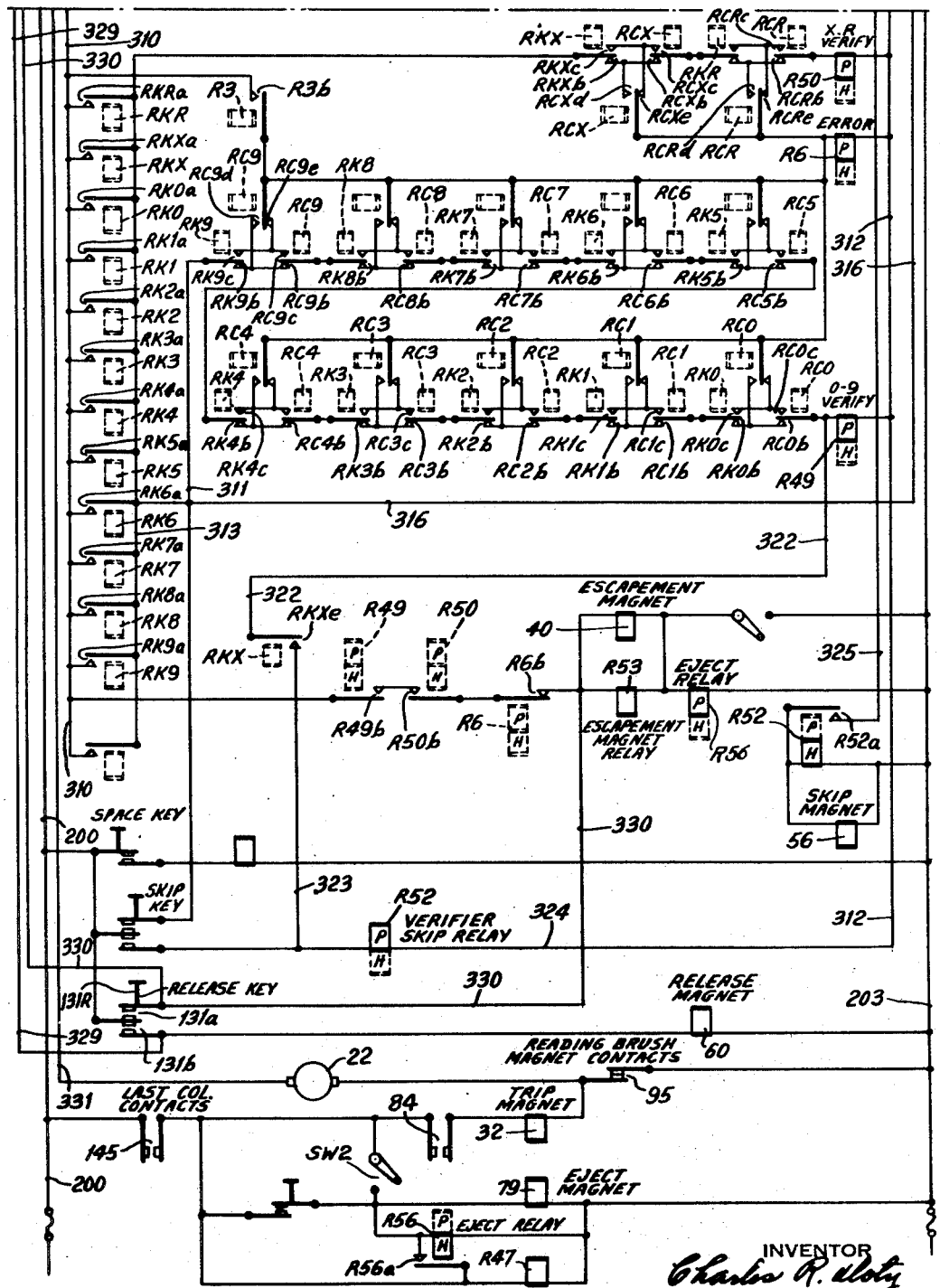

Figs. 16A, 16B and 16C placed one above the other in the order named constitutes a wiring diagram of the electric circuits of the apparatus.

The apparatus comprises two mechanically separate units shown in Fig. 1; a card feeding and sensing unit shown in the upper part of the figure and a tape sensing unit shown in the lower part, and so labeled. The mechanical arrangement of the card feeding mechanism is substantially the same as that found in the machine known as the "International Duplicating Key Punch," such as shown in the patent to F. L. Lee et al., No. 1,772,186. The machine shown in this patent is shown herein as modified for card sensing, which form of machine is shown in complete detail in the patent issued to O. B. Shafer, No. 2,315,741, granted April 6, 1943. All of the mechanical arrangements of the present card sensing machine are fully shown in the last described patent but will be briefly explained in the following, and in only so much detail as is necessary for an understanding of the present invention; and reference may be had to the patents cited for further detailed explanation.

CARD FEEDING MECHANISM

Referring to Fig. 1, record cards to be sensed or analyzed are placed in the magazine 10 from which they are advanced singly by means of a picker 11 toward the left to present their first column to a card sensing position above the sensing brushes designated 12 in Fig. 6. In this position the card carriage comprising a pusher 13 and a forward guide 14 engages the card to be analyzed and advances it step by step under control of the escapement mechanism to be later described so that the columns of the card are sensed in succession. Pusher 13 and guide 14 are carried by an escapement rack 15 (Fig. 1) and the picker 11 is carried by a rack bar 16. Rack 15 has a gear 17 (Fig. 1) meshing with its lower edge and bar 16 has a gear 18 meshing with its upper edge (see Fig. 7), both gears being mounted on a cross shaft 19. Due to this connection between the elements, the movement of the picker 11 toward the left as viewed in Fig. 1 is accompanied by movement to the right of pusher 13 and forward guide 14. At the commencement of operations the picker and pusher are shown in the position shown in Fig. 1.

The rack 16 is provided with a finger piece 20 (Fig. 1) at its right hand end extremity by means of which the rack 16 and picker 11 may be moved toward the left to feed a card from the magazine 10. Also, as will be later described, the machine includes a power drive of the rack 16 toward the left which has the same effect as the manual movement by the finger piece 20.

In either instance there is a movement of the pusher 13 in the opposite direction, the parts being so proportioned that when the card has been advanced to present its first column to the sensing brushes 12, the pusher 13 will have moved toward the right sufficiently to engage the right hand or trailing edge of the card and will now control the further advancement thereof in response to the operation of the escapement mechanism. A one-way clutch 21 (Fig. 7) permits the immediate return to the right of bar 16 and picker 11 under control of a spring (not shown).

The operation of card feeding just outlined is more fully explained in Patent No. 1,772,186, granted to F. L. Lee, et al. for a duplicating punching machine.

Secured to the underside of the base of the machine is a motor 22 (Fig. 7) coupled to a stub shaft 23 to which is secured a worm 24 (Fig. 6) in mesh with a worm wheel 24a, secured to a shaft 24b, one end of which has secured thereto a ratchet shaped clutch element 25 (see Fig. 7). Loosely mounted on shaft 24b is a gear 26 meshing with teeth on the lower edge of a rack bar 16 on which gear is mounted a disk 27. Mounted upon disk 27 is a clutch mechanism generally designated 28, one element of which is provided with a pin 29 positioned for engagement by a finger 30 integral with the armature 31 of magnet 32. With the machine at rest, the parts occupy the position shown in Fig. 7 and when magnet 32 is energized the finger 30 will operate the clutching mechanism to couple the disk 27 to the rotating ratchet 25 so that the gear 27 and gear 26 are rotated clockwise to drive rack bar 16 toward the left. The clutch mechanism is constructed, as explained in greater detail in the patents referred to, so as to remain in engagement for substantially a complete revolution, at the completion of which the clutching mechanism engages a fixed member 33, which effects uncoupling of the parts whereby they may automatically return to the position shown in Fig 7 under the influence of a spring not shown. This power drive of rack 16 towards the left has the same effect as the manual movement by the finger piece 20, that is, a card will be advanced to sensing position and by pusher 13 will engage the same for further step by step advancement and rack bar 16 may thereafter return to its home position without disturbing the advanced position of the card or pusher 13, this being permitted by the one-way clutch structure designated 21 in Fig. 7.

Also integral with the armature 31 of the trip magnet 32 is an arm 34 (see Fig. 6), the free end of which is adapted to bear on the center blade of pairs of contacts 35 and 36, to open the former and close the latter when magnet 32 is energized and they will be maintained in such position by latching bell crank 37, the lateral extension 38 of which is engaged by a plate 39 secured to gear 26 at the termination of the driving movement of the latter. Contacts 36 are used to control the energization of the driving motor 22 and their function as well as the function of contacts 35 will be more fully explained in connection with the circuit diagram.

ESCAPEMENT MECHANISM

The escapement mechanism now to be described in detail is of the same general nature as disclosed in the Schaaff patent, No. 1,426,223.

Reference may be had to this patent for further details of construction and operation.

When the card is in position above the sensing brushes 12 (Fig. 6), further advance is controlled by the escapement mechanism which in turn is responsive to the energization of magnet 40. Upon energization of magnet 40 its armature 41 will be rocked about a pivot in a clockwise direction and through a screw 42 secured to rod 43 will rock the rod 43 counterclockwise against the tension of a spring 44. The rod 43 is rocked as an incident to each spacing operation and has secured to one end thereof oppositely extending arms 45, 46 (see also Fig. 8) of which arm 46 is provided with a lateral extending pin for engagement with an enlarged opening in a stepping dog 47 which is loosely pivoted on rod 43. Opposite arm 45 is provided a pin extending into a slot formed in the locking dog 48. When rod 43 is rocked arm 46 will, through its pin and slot connection and dog 47, lift the latter out of one of the notches of the rack 15 and at the same time arm 45 will depress locking dog 48 into a notch between the rack teeth. At this time a spring 49 advances the loosely pivoted dog 47 a short distance just sufficient to permit this dog to move above the top of the next tooth. When the locking dog is again raised, stepping dog 47, due to the movement of rack 15, will ride down along the next tooth until it strikes the end thereof and the carriage is thereby arrested. The usual spring drum (not shown) is provided to bias rack 15 toward the right as viewed in Fig. 8. The detail structure of this dog and rack arrangement is well known and need not be further described and it is sufficient to note that for each operation of the space magnet 40 rack 15 is advanced one step or tooth, carrying with it pusher 13 and forward guide 14 so that the card is likewise advanced one step, each step of advancement being coextensive with columnar spacing of the columns of the card.

SKIP BAR

The machine is provided with a usual skip bar indicated at 50 (Figs. 8 and 9), provided for the purpose of skipping card fields which are not to be sensed and verified. Skip bar 50 is removably attached in the usual way to one side of the escapement rack 15 and is provided with suitable notches and cam surfaces which cooperate with the usual skip lifter arm 51 which has a beveled end 52. The end of the skip lifter arm 51 lies under the dog 47 (see Fig. 8), so that after the lifter 51 is moved toward the left as viewed in Fig. 9 at any time that a high portion of the skip bar is in line therewith, the beveled end of the lifter will cooperate with the cam surface of the bar to raise the end of the lifter which, upon being so raised, elevates the dog 47 to release rack 15 and therefore the card carriage. The lifter arm 51 will drop into the next notch in bar 50 and dog 47 will interrupt further movement of the rack at such point. The function of the skip bar 50 is to skip over the columns of fields which are not to be sensed and verified. The right end of the skip lifter 51 is connected to a slider 53 whose right hand end is provided with an opening into which the free end of the finger 54 extends. This finger is integral with armature 55 of skip magnet 56, the armature being pivoted at 57. With this arrangement energization of magnet 56 will cause lateral shifting of skip lifter 51 with consequent skipping operations. Upon deenergization of magnet 56, the parts are returned to normal by a spring 58. Located above the skip lifter 51 is a pair of contacts 59 which are closed when the skip lifter 51 is tilted by virtue of its engagement with a high portion of skip bar 50. The purpose of this pair of contacts will be explained in connection with the circuit diagram.

AUTOMATIC RELEASE OF CARD CARRIAGE FROM ANY POSITION TO LAST COLUMN POSITION

A further means by which the card may be advanced is controlled by a release magnet designated 60 (Fig. 6) which, when energized, will rock its armature 61 about pivot 62, causing the free end of an integral finger 63 to depress a release key 64. The mechanism controlled by this key is well known in this type of machine and is briefly as follows: The lower end of key 60 through the bell crank 65 will draw a member 66 toward the right as viewed in Fig. 6. This member 66 is suitably mounted for such movement and at its left hand end is provided with a cam surface 67 which cooperates with the edge 68 of the supporting plate 69. The member 66 also extends beneath the skip lifter 51 in a position generally indicated in Fig. 9, so that as the member 66 is moved toward the right, cam 67 cooperating with the edge 68 of plate 69 will cause an upward tilting of the left end of the member which in turn will lift the arm 51 upwardly, raising the stepping dog 47, whereupon the rack will be free to advance uninterruptedly to the left. Frictional engagement of the parts will maintain the member 66 in its shifted position so that escapement of the rack, when initiated by the magnet 60, will not be interrupted until the card has been fully advanced, that is, until the last column has been advanced to the sensing position. At this time a suitable projection carried by the rack will engage a depending extension of the left extremity of member 66 and will draw the member toward the left back to the position it occupies in Fig. 6.

Briefly summarizing, after the card has been initially advanced to present its first column to the sensing brushes 12, its further advance is controlled by the column by column movement through the space magnet 40. Multiple advancement is controlled through the skip magnet 56 in cooperation with the skip bar 50 and complete release of the card from any position to its last column position is controlled by the release magnet 60.

CARD SENSING MECHANISM

The card sensing brushes 12 are shown in Fig. 6. There are provided twelve of these brushes positioned side by side, there being one for each of the usual twelve horizontal rows of index point positions of the card. The brushes 12 are mounted in an insulating brush holder 90 which is mounted so that the brushes 12 are given substantially a vertical movement upwardly from the position shown in Fig. 6 to contact the card and effect electrical connections through the perforations therein with a common contact roller 91. The upward movement of brushes 12 is controlled by the reading brush magnet 92 which, when energized, will cause the brushes 12 to move upwardly through the mechanism generally designated 93. This mechanism is of the usual construction and detailed description thereof may be found in the patents referred to. Its purpose is generally to maintain the brushes in their lower position when they are not actually sensing perforations in the card and thereby preserve them against undue wear and against damage by any inadvertent backward movement of the record cards. The armature 94 of magnet 92 is arranged when attracted by the magnet to open a pair of contacts 95 and to close contacts 96, whose function will be explained in connection with the circuit diagrams.

MISCELLANEOUS CONTACTS

Several contacts in addition to those described are provided in the machine and the operation of these will be pointed out before the entire operation of the apparatus is explained in connection with the circuit diagram.

In Fig. 8 is shown a pair of contacts 145 known as "last column contacts." These contacts are closed by an arm 146 secured to the escapement rack 15 and so located that, when the escapement rack is advanced to the position in which the last column of the card is presented to the sensing brushes, the extension 146 will be engaged with and close contacts 145.

In the same Fig. 8 are shown contacts 149, the upper blade of which is shifted by an arm 150 which is loosely pivoted on the rod 43 and which has a lateral extension resting upon the upper edge of stepping dog 47 so that during escapement from one column to another the incidental raising of the stepping dog to arm 150 will cause opening of contacts 149 during the period that the dog is raised. These contacts and their operation are well known in the type of machine now being described and are generally known as "floating cam contacts."

In Fig. 6 there is shown a card lever 157 lying in the path of the record card as it passes from the magazine to the sensing position. When a card feeds from the magazine it causes rocking of the card lever 157 to effect closing of a pair of contacts 156.

COLUMN READOUT

The record sensing unit is provided with a column readout which is of a well known construction and is generally shown in Fig. 1, and diagrammatically in Fig. 16B.

Upon an extension 174 of the card carriage there is mounted a brush carrier of a column readout device 165 consisting of brushes 168, one of said brushes cooperating with a common conducting strip 166 (see Fig. 16B) and the other said brushes cooperating with spaced conducting segments 167. As is well known, the brushes 168 connect successively the conducting segments 167 to the common conducting strip 165 as the card carriage moves along column by column.

THE RECORD CARDS

Before explaining the general operation of the machine in connection with the circuit diagram and the operation of the tape sensing unit, an explanation will be given of the various punching arrangements that may occur in a column of the record card C to be verified. The card has usually twelve index point positions in which digits are represented by a perforation in the corresponding digital index point position as shown in the card C of Fig. 2. This card incidentally shows the digital and alphabetical code for designating digits and the alphabetical characters. The card C shown in Fig. 3 is shown perforated to represent an exemplary message which may be utilized by the machine of Patent No. 2,340,801 to control the perforation of a tape shown in Fig. 4 or vice versa, by the machine of Patent No. 2,340,800.

The alphabetical characters are represented by combinations of two perforations; one occurring in the digital positions 1-9 and the second occurring in the so-called "zone positions" 0, 11, 12 or O, X, R. The complete coding arrangement for the alphabet is given in the following table; where the hyphenated characters following the letter indicate the two index point positions that are perforated in a column to represent that letter.

Table 1

```
A  R-1     J  X-1     S  O-2
B  R-2     K  X-2     T  O-3
C  R-3     L  X-3     U  O-4
D  R-4     M  X-4     V  O-5
E  R-5     N  X-5     W  O-6
F  R-6     O  X-6     X  O-7
G  R-7     P  X-7     Y  O-8
H  R-8     Q  X-8     Z  O-9
I  R-9     R  X-9
```

In Fig. 3 the statistical card analyzed by the card sensing unit is shown perforated in columns 1, 2 and 3 to represent the number —123. Columns 5 to 13 are shown perforated in code to represent the name John Jones. When column 1 of the statistical card is under the sensing brushes ready to be verified the corresponding column of the tape is also in sensing position and if the designations in corresponding columns are alike the card and the tape will escape to the next column. This operation will be repeated for successive card columns whether the data represented therein comprises numeral or alphabetical data. This generally is the mode of operation of the machine for effecting verification but before the electrical circuits for effecting such operation can be described a general description of the tape sensing unit will be given.

TAPE SENSING UNIT

The tape sensing unit is identical to that shown and described in the patent to C. R. Doty, No. 2,340,801, patented February 1, 1944, and for convenience a detailed description follows:

Referring now to Figs. 4 and 5, the telegraphic tape 225, provided with feed perforations 226 and combinational code perforations 227, is fed from a supply roll 228 (Figs. 10, 12) under a guide post 229, over a tape guide arm 230, between a pair of separated blocks 231 and 232, over a sprocket wheel 233, and under a guide post 234 to a take-up reel 235. Sprocket wheel 233 is provided with the usual centrally located periphery teeth 236 for engaging the feed perforations 226 and feeding the tape in the direction shown by the arrow in Fig. 12. The said sprocket wheel is mounted on a shaft 237, suitably supported by side plate 239a and intermediate plate 239b, to which shaft ratchet wheel 238 is secured. Ratchet wheel 238 is rotated, step by step, by a spring urged pawl 240 (Fig. 11) pivotally mounted on a cam follower arm 241, the latter being secured to shaft 242 (supported by the said side and intermediate plates). Also secured to the shaft 242 is a latch arm 243, which when released permits a cam roller 244, carried by the cam follower arm 241, to ride on the periphery of a constantly rotated cam 245, and follow the contour of the latter. The contour of cam 245 is designed so that, upon release of the latch arm, the cam follower 241 and pawl 240, during rotation of the cam, are partially rotated in a clockwise direction, by means of spring 246, thereby causing the pawl to ride over a tooth of the ratchet wheel and be in a position for advancing the ratchet wheel, one step, when the high point of the cam urges the cam follower arm and pawl in a counterclockwise direction. A fixed plate 247 secured to side plate 239a is provided with a camming surface which is engaged by the free end of pawl 240, as the latter is urged in a counterclockwise direction, thus, insuring a positive driving connection between the pawl and ratchet wheel, and, also preventing an overdrive of the ratchet wheel. The usual spring urged detent arm 248 is provided, and cooperates with a detent wheel 249 fixed to shaft 237 for maintaining the said shaft 237, ratchet wheel 238, and sprocket wheel 233 in the advanced position.

Figure 12:
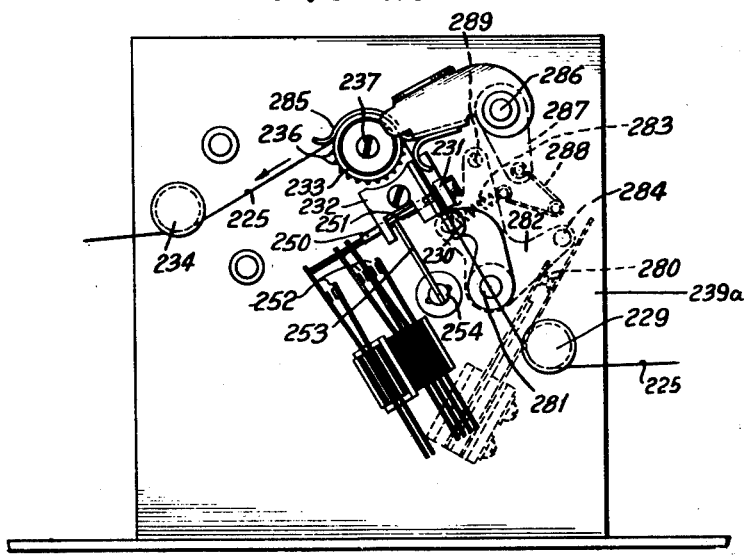
Fig. 12 is a view in side elevation showing in detail the parts of the tape sensing mechanism and some of the tape feeding mechanism.

By this described mechanism, the tape 225 is advanced one step, for each cycle of operation of the machine for presenting the next transverse row of code perforations to the sensing elements. A single sensing element, such as sensing pin 250 (Fig. 12) having a shouldered recess 251, is provided for each unit of the code. The individual five sensing pins are suitably disposed in individual openings formed in the U-shaped guide block 232, and are arranged to cooperate with individual sets of suitably disposed contact means 252. In the instant disclosure, five sets of contacts are provided although only three sets are visible in Fig. 12 because the remaining two sets are behind those shown, each set having an elongated spring blade which is engaged by an insulated end of the related sensing pin. With the sensing pins in retracted positions, as shown in Fig. 12, the said spring blades are urged sufficiently, to the left, to open the contacts 252.

Figure 11:
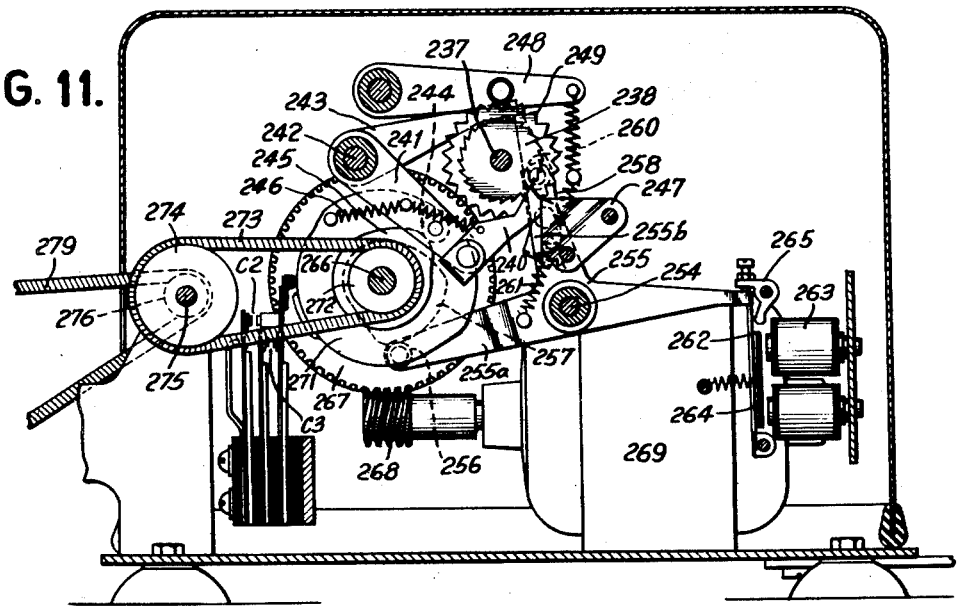
Fig. 11 is a sectional view taken on the line 11—11 of Fig. 10.
Figure 13:
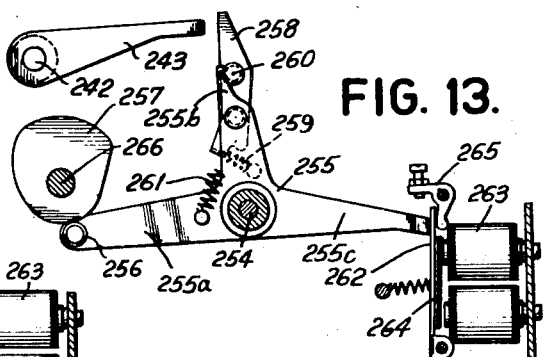

Common to the said recesses of the sensing pins is a positionable vane of bail 253 secured to shaft 254. Shaft 254 is suitably journaled in side plate 239a and has secured thereto an inverted T or three armed lever 255, the left arm 255a of which, as viewed in Fig. 11, is provided with a cam roller 256 adapted to cooperate with a constantly rotated cam 257. The upright arm 255b of the said inverted T lever, carries a pivoted latch lever 258 which is urged, in a counterclockwise direction, by spring 259 so that the stop 260, fixed to the said latch lever, normally engages the upper extremity of the said upright arm of lever 255 (also see Figs. 13 and 14). The extremity of the right arm 255c of lever 255, as viewed in Fig. 11, normally is urged, by spring 261, against the top edge of latch plate 262 secured to the released armature 264 of latch magnet 263, thus latching the said inverted T lever in the normal position shown in Fig. 11. Normally, the latch arm 243 is held in a raised or latched position as shown, by means of the pivoted latch lever 258, thereby maintaining the tape feed pawl 240 in its uppermost or end-of-the-stroke position, as indicated in Fig. 11. With the inverted T lever in the described normal position, the constantly cyclic operations of cams 245 and 257 exercise no controlling effects on the related cam follower arms 241 and 255a, respectively. Also, in the said normal position of the inverted T lever, the bail 253 is moved to its extreme position to the left, as viewed in Fig. 12, against the lower shoulders of recesses 251 of the sensing pins 250, thus, holding the latter in their retracted positions, and maintaining the associated contacts 252 in normally open positions.

Upon momentary energization of latch magnet 263, its armature is attracted and the latch plate 262 is withdrawn from the arm 255c, so that the said lever 255 is unlatched or released, and, under the influence of spring 261, the latter is urged in a clockwise direction (see Fig. 13), causing (1) release of latch arm 243, due to withdrawal of latch lever 258 on arm 255b, (2) release of arm 255a and thereby permitting full or effective cooperation between cam 257 and cam roller 256, and (3) release of the sensing pins 250, due to the partial clockwise rotation of bail 253.

Upon release of latch arm 243, cam follower arm 241, during a cyclic operation of cam 245, is partially rotated, first, in a clockwise direction, and then, in a counterclockwise direction to advance the ratchet wheel 238, shaft 237, and sprocket wheel 233, by means of pawl 240, thereby advancing the tape, one step, and presenting the next transverse row of code perforations to the sensing pins.

Upon release of the sensing pins 250, the code perforations are detected or sensed, by the spring urged pins permitted to pass through the perforations and extend into suitable slots or openings formed in the block 231. The travel of the code groups of pins sensing the perforations is sufficient to permit the related contacts 252 to be closed. In this manner, code groups of impulses can be initiated in the individual signaling or control circuits connected to the said sets of contacts 252 for suitable controlling purposes.

Figure 14:
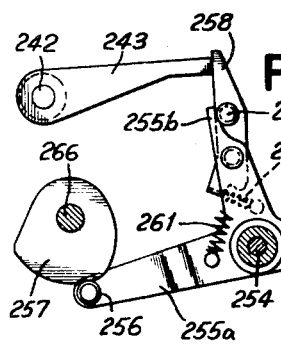
Figs. 13 and 14 are detail views showing different stages of operation of certain elements of the tape sensing unit.

During a cyclic operation of cam 257, the lever 255 is first partially rotated in a clockwise direction, and then in a counterclockwise direction. When the highest portion of cam 257 is effective, the lever 255 is urged in a counterclockwise direction sufficiently to raise the arm 255c above the released latch plate 262, as shown in Fig. 14, thereby latching the lever 255 in the normal position. Also, during the cyclic operation of cam 257, and upon the partial counterclockwise rotation of lever 255 and shaft 254, the bail 253 is restored to its normal position, during which restoring operation the shouldered recesses of the displaced sensing pins 250 are engaged and withdrawn from the perforations in the tape to restore the said pins and associated contacts to their normal positions. The said sensing pins and contacts are locked in this normal position so long as lever 255 is maintained in the described latched position.

Obviously, the described tape feeding operation must be suppressed until the actual sensing of the code perforations and withdrawal of the sensing pins from the tape are completed. In the instant case, it is preferred to prevent tape feeding until the sensing pins are latched in their normal positions. Accordingly, the cams 245 and 257 are arranged so that the high point of the latter is effective to latch the lever 255, before the high point of the former is effective to cause actuation of the tape feeding pawl 240 (see timing chart Fig. 15). For this reason, the latch lever 258 is arranged to be pivotally disposed on arm 255b. After the lever 255 is restored to normal, as shown in Fig. 14, and before the high point of cam 245 is effective to raise the latch arm 243 to its latched position, the pivoted latch lever 258 abuts the end of latch arm 243, and is only restored into latching position by spring 259, when the latch arm 243 is raised over the said lever 258. In this manner, tape feed operations are effected after the sensing pins are retracted from the tape, and latched in the said retracted positions. It should also be mentioned that a suitably pivoted restoring lever 265 is provided for positively moving the latch plate 262 to its normal position, when the arm 255c is raised.

Figure 10:
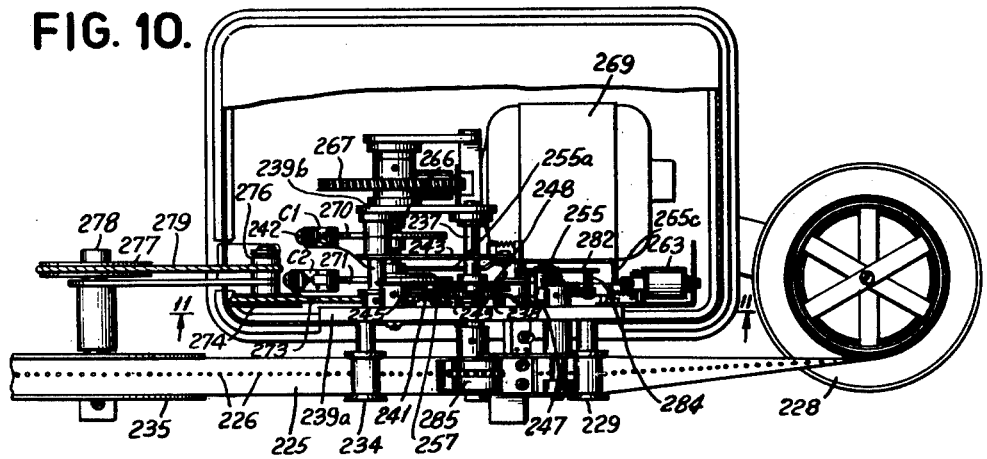
Fig. 10 is a plan view of the tape sensing unit.

Now, with reference to Figs. 10 and 11, it is seen, that cams 245 and 257 are secured to and driven by shaft 266 to which worm gear 267 is affixed, said gear being in mesh with a worm 268 constantly rotated by motor 269. Thus, the cams are operated continuously for controlling the sensing and tape feed operations, at such times when the control magnet 263 is energized. Also, if desired for various circuit controlling purposes, cams 270 and 271 are shown secured to shaft 266 for controlling the operations of the suitably disposed and related contacts C1, and C2, C3, respectively. In addition thereto, a suitable frictional drive may be provided for the take-up reel 235, by providing a driving pulley 272 on shaft 266, which pulley is connected by a spring belt 273 to intermediate pulley 274, the latter being secured to stud shaft 275 carrying pulley 276, which in turn is connected to pulley 277 mounted on the take-up reel shaft 278 by spring belt 279.

Referring to Fig. 12, additional circuit controlling means can be provided in the form of contacts 280, which are arranged to be opened, upon exhaustion of the tape supply to the sensing pins 250. The tape guide arm is secured to shaft 281 journaled in the side plate 239a, which shaft also carries bell crank lever 282. By means of spring 283, the said bell crank and tape guide arm are normally urged in a clockwise direction so that an insulating pin 284, secured to lever 282, opens contacts 280. This motion, however, is prevented when the supply of tape from roll 228 is not exhausted, due to the tape riding over the guide arm 230 and causing the said guide arm and pin 284 to be held in the positions shown in Fig. 12. An arcuately shaped and slotted tape guide member 285 is also provided to press the tape against the sprocket wheel 233, which member is secured to stud shaft 286 journaled in side plate 239a. Also secured to stud shaft 286 is a depending arm 287 arranged to engage the suitably disposed toggle spring 288. The said arm 287 is capable of engaging a pin 289 (secured to lever 282), whenever the guide member 285 is raised manually (for example, during insertion of a new tape), to rotate the bell crank lever 282 and tape guide arm 230 in a counterclockwise direction, thus facilitating tape removal or insertion operations.

In order to insure proper synchronous operations of the described elements, it is preferred to include the cam controlled contacts C1 in the circuit connected to the control magnet 263. In this manner, irrespective of the times the control impulses are impressed upon the circuit including magnet 263, the latter is not energized to release the said lever 255 until a predetermined time during each cyclic rotation of cams 245 and 257, as indicated in the timing chart in Fig. 15. Thus, it is seen, by this provision, that the operated elements are influenced and actuated in the described sequences.

This aforedescribed tape sensing unit is the same as that shown and described in the patent to C. R. Doty, et al., No. 2,340,801 granted February 1, 1944.

OPERATION

Referring now to Figs. 16A, 16B and 16C arranged sequentially one below the other, the operation of the described units will be explained in connection with the certain diagram.

Assume that the telegraph tape 225 is properly inserted in the sensing unit, and that a statistical card is positioned in the first column position in the card sensing unit; also assume that the first part of the message perforated in the tape is 1, 2, 3 John Jones and that the apparatus is suitably plugged by the plug connection 302 from the 1 column position of the column readout device 165 to start plug socket (see Fig. 16B). Sensing operations are started automatically for the statistical card for verification and comparison with the sensed data represented in telegraphic code in the tape upon presentation of the first column of the card to the sensing station.

Under the mentioned conditions and upon closure of latch contacts 35 and floating cam contacts 149, a circuit is established from line 200 which is one side of a power supply line, through said latch contacts 35 (Fig. 16B), through the floating cam contacts 149, conductor 202, the start to read relay R5, R1b relay contacts now closed, plug connection 302, column 1 conducting segment 167, brushes 168, common conducting strip 166 to the other side of the line 203, thus causing said relay to be energized.

It will be recalled that when a card is in sensing position, card lever contacts 156 (Fig. 16A) of the sensing unit are closed, thereby closing a circuit from line side 200, latch contacts 35, the conductor 201, through said contacts 156, R1 relay to line 203. Card lever R1 closes its stick contacts R1a to extend the stick circuit to conductor 201, retaining the R1 relay energized until latch contacts 35 open during the ejection of the card which has been verified. Hence, at this time the R1b relay contacts (Fig. 16B) will be closed to enable the energization of the start to read relay R5.

Upon closure of the cyclically operable cam contacts C3 (Fig. 16A), a circuit is completed from the conductor 201, said cam contacts C3, R5a relay contacts now closed, coil of relay R2 to the line side 203, and the holding circuit for this relay is immediately established back to conductor 201, through the R2a relay contacts and the following relay contacts now closed, R6c, R54a, R4a, R3a, R7b, thence through stop key contacts 305 and the tape controlled run-out contacts 280. This holding circuit is maintained continuously until one of the mentioned normally closed contacts included therein is opened.

At the end of each cycle of operation of the sensing unit, cam contacts C1 are closed and with contacts R2b now closed, a circuit is completed to the latch magnet 263 from conductor 201, cam contacts C1, relay contacts R2b, latch magnet 263 to line 203, thus energizing said magnet and rendering the sensing elements 250 operative. It is to be noted that said cam contacts C1 are opened and closed during each cycle to effect a momentary energization of the latch magnet 263. The timing of the sensing unit is arranged, in the instant case, so that a cycle of operation thereof is not completed before the card sensing operation for each column is completed.

SENSING OF NUMERICAL DATA

It was assumed that the first three characters of the data recorded on the tape belonged to the numerical group, and accordingly as shown in Fig. 4 these data designations are preceded by a common key code "figure shift" designation. During the first operation of the sensing elements and upon sensing the said "figure shift" code designations, the 1, 2, 4 and 5 contacts 252 are closed.

Figure 15:
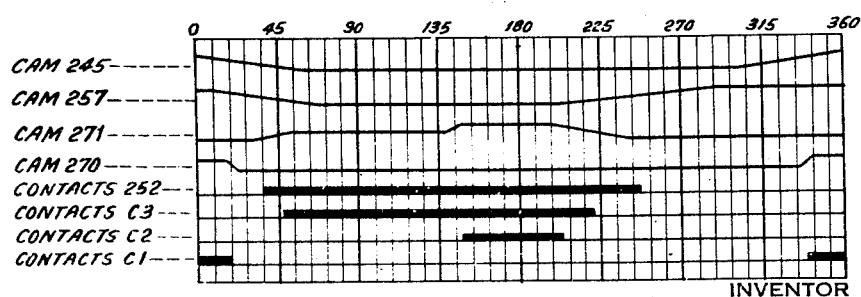
Fig. 15 is a timing chart of cyclically operable elements of the sensing unit.

Upon closure of cam contacts C3 (Fig. 16A), circuits are completed through said contacts 252 to selectively energize the translating relays R9, R10, R11, R12 and R13, according to the particular contacts 252 closed and which are closed in accordance with the perforations in the code positions of the tape. The energizing circuit for the translating relays is from line 200, latch contacts 35, conductor 201, cam contacts C3, said sensing contacts 252 and translating relays R9—R13, to line 203, thus causing said relays to be energized. As shown in the central portion of Fig. 16A, such relays transfer their respective contacts in a translating circuit to selectively energize the distributing relays R14—R44. Accordingly, with the sensing of the "figures" code designations the associated contacts R9a, R10a, R12b and R13c are transferred so as to select a circuit to a distributing relay which is closed when cam contacts C2 close. Cam contacts C2 are closed during the time that cam contacts C3 are closed as indicated in Fig. 15. The circuit is from line 200, latch contacts 35, conductor 201, cam contacts C2, R9a contacts now transferred, R10a contacts now transferred, R11a contacts now normal, R12b contacts now transferred, R13c contacts now transferred to the coil of the "figure shift" distributing relay R18, to line 203, energizing said relay. A holding circuit is established for this relay extending from line 203 through R18 relay, the respective "h" holding contacts, normally closed relay contacts R14a of the letters relay R14 and line side 200. This holding circuit is maintained until the normally closed contacts R14a of the "letters" relay R14 are opened.

Referring to the bottom of Fig. 16A, the energization of the R18 relay will transfer its group of contacts R18a—R18m inclusive and such contacts will be maintained transferred.

Since the holding circuit for the R2 relay (Fig. 16A) is still maintained closed the R2b relay contacts will remain closed and at the end of the cycle of operation of the tape sensing unit when figures shift designation is sensed, C1 contacts will again close to transmit an impulse to the latch magnet 263 and the tape sensing unit will now operate for the second cycle, thus feeding the perforated tape to present the next column of perforations representing the digit 1 in the exemplary message of Fig. 4 to the reading pins. Since to represent the digit 1 holes are at the 1, 2, 3 and 5 code positions, closing of the sensing contacts 252 similarly designated will cause the energization of the R9, R10, R11 and R13 translating relays. Such relays will transfer their respective translating contacts in the afore-described translating circuit and upon closure of the C2 contacts, the R16 distributing relay will be energized through the selected circuit. The R16 relay will close its respective holding contacts h, such relay being maintained energized through the respective holding contacts h, wire 202, the floating cam contacts 149, latch contacts 35, to the line side 200. This holding circuit is maintained until floating cam contacts 149 are open as an incident to the next card sensing operation. The R16 relay will close its respective contacts R16a, thereby closing a circuit from the line side 200, through latch contacts 35, floating cam contacts 149, wire 202, R16a relay contacts, through R18h contacts now transferred to the 1 digit line of the group 307, the respective RK1 comparison relay (Fig. 16B), reading brush magnet contact 96 now closed as will be subsequently explained, normally closed relay contacts R48a, normally closed cutout contacts 116, to the other line side 203. The group of comparison relays designated RK1—RK9 and RK0 are selectively energized in accordance with the numerical designation on the tape.

Summarizing, it will be evident that the digits are represented in a combination or Baudot telegraphic code on the tape and are translated and ultimately represented by the setup of a single RK comparison relay. Such conversion is effected to enable a setup or representation of the numerical characters represented on the tape which conforms to the statistical code.

Before the electrical comparing or verifying circuits are explained and described, it should be observed that after each analysis of a column of the perforations of the tape representing alphabet or numerical data, a selective setup of the RK relays is made and after being utilized for a verifying operation the relay is deenergized when the distributing relay R14—44 that selects it is deenergized. In the example of Fig. 4 the column of perforations representing the digit 2 will then be sensed and the R9, R10 and R13 translating relays would be energized. Through the translating circuits the R20 distributing relay will be energized, resulting in the selection of the comparison relay RK2. This operation will then be repeated for the next column of perforations on the tape which, in the assumed example, would be 3, represented by the perforation at the 1 code position which ultimately results in the energization of the RK3 comparison relay. It is explained that after a distributing relay R14—R44 is energized, its holding circuit will be maintained through the floating cam contacts 149. Upon a column escapement of the card carriage to the next column, by circuits to be subsequently described such contacts will open, thereby breaking the holding circuit and restoring the distributing relays R14—R44 to deenergized condition, and enabling their subsequent energization. Deenergization of a distributing relay opens the energizing circuit to the selected RK relay, and the latter deenergize concurrently. Of course, as long as numeral characters are sensed the R18 relay will be held energized through the R14a contacts of the "letters" relay R14, maintaining the group of contacts R18a—R18m transferred until alphabetical characters on the tape are sensed, as will be subsequently described. The R18n relay contacts are open during sensing of numerical data so as to prevent the energization of the RKR, RKX or RK0 relay through the closure of the "b" relay contacts of the energized distributing relays.

The selective energization of the RK comparison relays has been explained for several digit representing characters and it is thought unnecessary to describe them for all the digits. However, for the remaining digits the particular relays which are energized to result in the selective energization of an RK comparison relay can be understood from the following:

Table 2

| Digit Expressed on Tape | Translating Relay Energized | Distributing Relay Energized | Comparison Relay Energized |
| --- | --- | --- | --- |
| 1 | R9, 10, 11, 13 | R16 | RK1 |
| 2 | R9, 10, 13 | R20 | RK2 |
| 3 | R9 | R29 | RK3 |
| 4 | R10, 12 | R35 | RK4 |
| 5 | R13 | R44 | RK5 |
| 6 | R9, 11, 13 | R24 | RK6 |
| 7 | R9, 10, 11 | R17 | RK7 |
| 8 | R10, 11 | R33 | RK8 |
| 9 | R12, 13 | R42 | RK9 |
| 0 | R10, 11, 13 | R32 | RK0 |

In tracing the completion of the energizing circuit for the RK comparison relays it was stated that such circuit is completed through contacts 96 which are now closed. It will be observed from Fig. 6 that such contacts are closed when the reading brush magnet 92 is energized. The circuit for energizing said magnet 92 in the card sensing machine is as follows: from line side 200, latch contacts 35 (Fig. 16B), wire 310, last column relay contacts R47a now closed, R1b relay contacts now closed because card lever relay R1 is energized due to the presence of a card in sensing position, normally closed relay contacts R52b, reading brush magnet 92, door controlled contacts 109, normally closed cutout contacts 116, to line side 203. Contacts 109 in the circuit just described correspond to the contacts similarly designated in Shafer Patent No. 2,315,741, and are closed in the manner explained in this patent. In general, when the card sensing machine is conditioned for card sensing operations, such contacts 109 are first closed by closing of a door. As a consequence of the energization of the magnet 92, brushes 12 are moved in contact for sensing the first column of the card and at the same time contacts 96 are closed to enable the selective energization of the RK comparison relays.

Before the verifying circuits will be described, it is pointed out that, referring to Fig. 16B, a series of relays designated RC0—RC9 inclusive and RCX and RCR provide the card controlled comparison relays which are selectively energized under control of the card perforations wherever they occur in the card column sensed.

As a consequence of the energization of the magnet 92 the brushes 12 are moved into contact with the card so that upon a brush 12 encountering a perforation, a related RC comparison relay will be energized.

The energizing circuit is from the line side 200, latch contacts 35, floating cam contacts 149, common contact roller 91, through a perforation in the card column sensed, the related brush 12, associated comparison relay RC, contacts 116 now closed, to line 203. In the assumed example, since there is a perforation at the 1 index point position in the first column sensed, the RC1 comparison relay will be energized.

Verifying Circuits

The verifying circuits are shown at the top of Fig. 16C. Relay magnets RK are provided with a set of contacts which are designated by the suffix a, such as RK9a, RK8a, etc. and also with a second set of contacts with the suffix b and a third set of contacts with a suffix c. In Fig. 16C there are shown contacts controlled by the RC relays, there being b, c, d and e contacts for each of the RC relays. For example, relay RC9 when energized opens contacts RC9b and closes contacts RC9c. Also when energized relay RC9c closes contacts RC9d and opens contacts RC9e. The b and c contacts of the RC magnets are shown adjacent to the corresponding b and c contacts of the related RK magnets and are so wired that a series circuit extends normally through the b contacts of both the RK and RC magnets identified by the same numeral subscript, the lower verifying circuit beginning with the contacts RK9b and extending serially through contacts RC9b, RK8b, RC8b, RK7b, RC7b, etc. through the RC0b to a so-called 0–9 verification relay R49. This series circuit is controlled by the RC and RK magnets 0-9, inclusive. The RC and RK magnets X and R and their b contacts control, as shown in the upper right hand corner of Fig. 16C, a separate upper verifying circuit running from contacts RKXb, through contacts RCXb, RKRb, RCRb to a second so-called XR verification relay magnet R50.

The c contacts of any related pair of magnets RK and RC are wired to create a shunt circuit around associated b contacts upon simultaneous energization of both the RK and RC magnets. Thus, for example, if magnets RK9 and RC9 are both energized the series circuit will run from contacts RK9c to contacts RC9c and thence to contacts RK8b and then on as before to the 0–9 verification magnet R49. Similarly, if magnets RKX and RKR are both energized, the second circuit for the X—R verification relay R50 will run through the contacts RKXc and RCXc. It will be apparent, therefore, that if any of the RK or RC magnets are energized without accompanying energization of the corresponding RC or RK magnets, respectively, the circuit to the verification magnets R49 and R50 is not completed. When such nonconformity occurs, a circuit will be completed to energize an error relay R6 which may be explained by a specific illustration. Assuming that the RK9 magnet is energized without an accompanying energization of the RC9 magnet there will be a circuit from contacts RK9c, through contacts RC9e to the magnet R6. Conversely, when magnet RC9 is energized without accompanying energization of magnet RK9, a similar circuit is traceable from contacts RK9b to contacts RC9d to the error magnet R6.

Likewise, for the arrangements including the RK and RC magnets for the 11 and 12 or X and R positions, if magnet RKX is energized without accompanying energization of magnet RCX, a circuit follows from contacts RKXc, through contacts RCXe to magnet R6. Again, if magnet RCX is energized without accompanying energization of magnet RKX, a circuit will run from contacts RKXb, through contacts RCXd to magnet R6.

Briefly summarizing the operation of the verifying or checking circuits the latter are controlled by the RK relays selectively energized under control of the translating and converting means and are also controlled by the comparison relays RC selectively energized under control of the card sensing means. In the verifying and checking circuits, a circuit path to R49 and R50 relays is provided when corresponding RK and RC magnets are energized or when none of them is energized. When either an RK or RC magnet is energized without accompanying energization of the other magnet, the circuit path for the R49 or R50 magnet is broken and a circuit path is provided for the error magnet R6.

Continuing now the operation of the machine, when the first card column contains a 1 perforation and also when the corresponding column of the tape represents 1, magnets RK1 and RC1 are both energized. A complete lower verifying circuit can now be traced from line 200 through latch contacts 35, wire 310 (Figs. 16B and 16C), contacts RK1a, thence serially through the b contacts of the unenergized RK and RC relays to RK1c contacts and RC1c contacts now transferred, thence through RK0b and RC0b contacts now closed, to pickup coil of relay R49, wire 312, contacts R48a, contacts 116, to line 203. A parallel circuit extends from RK1a contacts (Fig. 16C) serially through the b contacts in the upper checking circuit to pickup coil of relay R50, wire 312 contacts R48a (Fig. 16B), contacts 116 to line 203. In this manner, sensing of a 1 perforation in the card C accompanied by the sensing of perforations in the tape representing 1 will cause energization of both verification relays R49 and R50. In the circuit diagram for the purpose of simplicity, the wiring to the pickup and holding coils of relays R49 and R50 are shown separated but on the other hand it is indicated in Figs. 16B and 16C, which coil in the circuit is the pickup and which is the holding coil. Thus, when the pickup coil of relay R49 is energized it closes its contacts R49a (Fig. 16B), thereby establishing a circuit through the holding coil which is traceable from the line 200, latch contacts 35, wire 310, wire 314, wire 315, holding coil of relay R49, contacts R49a, contacts R48a, contacts 116 to line 203. In the same manner the pickup coil of R50 closes contacts R50a to energize the holding coil of the R50 relay through a similar circuit.

Referring to Fig. 16C the relays R49, R50 and R6 each have a pair of b contacts of which R6b are normally closed and R49b and R50b are both closed when both relays are energized. Simultaneous energization thereof determines correctness in the verifying operation and a circuit is then completed from line 200, through latch contacts 35 (Fig. 16B), wire 310, contacts R49b, R50b, R6b, escapement magnet 40, R56 eject relay to line 203. Concurrently, escapement magnet relay R53 in shunt therewith is energized. Although R56a contacts now close they are ineffective to close the circuit in which they are in series because last column contacts 145 are now opened, and also while R53a contacts (Fig. 16B) close, a circuit to the R54 relay is not closed at this time because the circuit is opened by the column readout 165. Energization of magnet 40 will operate the escapement mechanism to advance the card to the next column and in doing so the escapement dog in Fig. 8 will momentarily open contacts 149 (see Fig. 16B). While such contacts 149 are closed, a circuit is normally closed from line 200 through latch contacts 35, floating cam contacts 149, coil of relay R51, contacts 116 to line 203, thus energizing relay coil R51. When floating cam contacts 149 open, the relay magnet R51 is deenergized, enabling contacts R51a to close, thereby closing a circuit to R48 relay traceable as follows: From line 200, through latch contacts 35, wire 310, wire 314, wire 315, relay contacts R51a, relay magnet R48, contacts 116, line 203. Magnet R48 will open its contacts R48a to drop out the energizing circuits for the verification magnets R49 and R50.

During the carriage escapement the opening of the floating cam contacts 149 also opens the energizing circuit for the RK and RC relays and also breaks down the holding circuit 202 for the selected distributing relays R14—R44, and the latter now deenergize and open their "a" contacts in the energizing circuit of the RK comparison relays.

The above described functions are repeated for verifying card columns 2 and 3 of the card shown in Fig. 3 and the corresponding columns of the tape shown in Fig. 4 and upon determination that corresponding columns represent the same numeral designation the tape is spaced in the next column and concomitantly the card spaces likewise. After sensing the card column representing the digit 3 the card spaces to card column 4 in which no card perforations occur, designating a space. No RC relays are now energized. The corresponding column of the tape 225 of Fig. 4 is also sensed during which operation a perforation at the 3 code position is analyzed, thereby energizing the translating relay R11 to transfer R11c contacts which results in transferring the R11d contacts.

Upon closure of C2 cam contacts, a circuit will be closed through the translating circuit to the space relay R41 (Fig. 16A). The latter closes the R41b contacts and a circuit is now closed from line side 200, latch contacts 35, floating cam contacts 149, wire 202, R41b contacts, wire 316 (Figs. 16A, 16B and 16C in the order named) to wire 311, and thence serially through the "b" contacts of all of the RK and RC relays to energize the R49 relay, and through the b contacts of the RKX and RKR relays and the RCX and the RCR relays to energize the verifying relay R50. Both relays are energized provided that no perforations are sensed in the corresponding card column. By the same circuit connections previously described, the escapement magnet 40 will be energized and the card will escape to the next column 5 in which a J alphabet designation appears. The tape will be spaced to the next column in which "letter shift" designation appears.

Since, for the designation of "letter shift" a perforation appears in each code position, translating relays R9—R13 are energized and their contacts transfer to close a circuit path in the translating circuit to the letters relay R14 (Fig. 16A) which closes its h contacts to provide the holding circuit back to wire 202. R14 relay opens the R14a contacts to open the holding circuit for the figure shift relay R18 and deenergization of the latter enables R18n contacts to close and its relay contacts R18a—R18m are now restored to normal position, as shown in the bottom of Fig. 16A. In the operation of the machine for sensing the letter shift designation, none of the RK relays is energized and therefore the verifying circuit is not closed because none of the "a" contacts of the RK relays is closed (Fig. 16C) and no impulse will be transmitted to the escapement magnet 40. Thus, the card carriage will remain at the card column position 5 for sensing the first alphabetical character "J." However, cam contacts C1 transmit an impulse to the latch magnet 263 to space the tape to the next column and the tape sensing means now senses the column representing the alphabetical character J by a coded representation involving perforations at code positions 1, 2 and 4. The verifying circuits are now conditioned for verifying the alphabetical data in these card columns explained as follows:

Verifying Alphabetic Punching

It will be assumed that the first letter J of the word John which is designated both in a column of the tape and also in card column 5 of the statistical card is to be verified. The character J is represented on the tape by perforations at the code positions 1, 2 and 4, whereas on the card it is represented in the statistical code by perforations at the X and 1 index point positions. Analysis of the perforations in the card will cause the energization of relay magnets RCX and RC1.

Analysis of tape perforations representing J at 1, 2 and 4 code positions results in the energization of translating relays R9, R10 and R12 which transfer their respective relay contacts to close a circuit path of the translating circuit to effect the energization of the R19 relay (Fig. 16A), representing a setup of the character J. R19 relay closes its h contacts and a stick circuit extends back through such contacts, wire 202, floating cam contacts 149, latch contacts 35 to line 200. Relay coil 19 closes its "a" contacts and a circuit is now closed from the wire 202, R19a contacts, the "1" line of the group 307, RK1 comparison relay (Fig. 16B), contacts 96 now closed, relay contacts R48a, contacts 116 to line 203. In additional distributing relay R19 closes its b contacts and a supplemental circuit is now closed from wire 202, R18n relay contacts now closed, R19b contacts now closed and wire 318 to the RKX comparison relay (Fig. 16B), the remainder of the circuit being as just traced for the RK1 comparison relay. At this point in the operation, comparison relays RK1 and RKX are energized and comparison relays RC1 and RCX.

In general, the wiring arrangement between the a and b contacts of the distributing relays and the RK comparison relays is arranged in accordance with the coding tables set forth hereinabove so that the RK comparison relays will be energized in combinations according to the code. Each distributing relay appropriate to an alphabetical character selects by its "a" contacts a comparison relay RK1—RK9 and also such distributing relays through their "b" contacts select a rely RK0, RKX and RKR, according to the preceding code.

In the assumed example magnets RC1 and RK1 will open their RC1b, RK1b contacts (Fig. 16C) in the lower verifying circuit which will be recompleted by the closure of contacts RC1c, RK1c so that the concurrent closure of RK1a contacts will establish the circuit through the verification relay R49. Similarly, in the upper verifying circuit the relays RCX, RKX will open their contacts RCXb, RKXb to break the checking circuit which is established by the closure of contacts RCXa, RKX, so that the concurrent closure of contacts RKXa will enable the energization of the second verification relay R50. The energization of the two relays R49 and R50 establishes the circuit for the energization of the escapement magnet to cause the card carriage to be spaced to present the next column to the sensing brushes 12. Since the impulse circuit to the latch magnet 263 is still maintained C1 contacts will transmit an impulse thereto to space the tape to sense the next column.

Where the alphabetical character to be verified is a combination of the 0 hole and one of the other digits, it is seen that the related C magnets will open the lower checking circuit at two points, that is, contacts RC0b will open and if, for example, the second perforation is in the 3 position, the contacts RC3b will also open and the related RK contacts will re-establish the circuit at these two points if the corresponding K magnets are energized as a result of the analysis of tape perforations representing the same character. In this case the first and second verification relays R49 and R50 will be energized through the RK0a contacts and the RK3a contacts. After verification of the first column representing an alphabetical character, verification of the next corresponding columns of the tape and card will ensue and are carried out in the manner just described. Such operations will be repeated until a point is reached where machine operations are different, which will be subsequently described in detail.

Indication of an Error

From what has been explained above, it is apparent that when the perforations in the card columns sensed agree with the character representation in the corresponding tape column, a C magnet or magnets will be energized and the corresponding K magnet or magnets will also be energized and in case of a blank column on the card and a space designation on the tape, none of these magnets will be energized resulting in the energization of both verification relays R49 and R50 which control the escapement of the card to the next column and the tape to a successive card column. Under conditions of disagreement where either a K or C magnet is energized without accompanying energization of the other corresponding magnet, one or both of the relays R49 and R50 will not be energized so that the escapement circuit cannot be completed and the error circuit through the *d* or *c* contacts of the C magnets will energize the error relay R6. When the pickup winding of this relay is energized, its contacts R6a (Fig. 16B) are closed and the holding winding is energized and held in the same manner as the holding coils of the magnet R49 and R50. In parallel with this holding coil is an indicating lamp 171 which then lights and remains so, indicating to the operator that an error has been detected either in arrangement of the perforations on the card or the perforations on the tape. Upon detection of error, therefore, the column being verified is not advanced but remains in sensing position and the indicating lamp 171 remains lighted. Also referring to Fig. 16A, R6 relay opens relay contacts R6c, opening the holding circuit for the R2 start relay and the latter deenergizes to enable its contacts R2b to open. This opens the impulse circuit to the latch magnet 263 and therefore the tape cannot be fed and will remain in sensing position.

The holding circuit of lamp 171 and relay R6 are broken by pressing against the finger piece 110 (Fig. 1) which is the same designated element in the Shafer Patent No. 2,315,741. Through connections shown in detail in this patent and which do not form any part of the present invention, manipulation of finger piece 110 will open cutout contacts 116 (Fig. 16B) and restore the circuits to their normal condition. Recognizing that an error has been detected the operator can restart verifying operations by depressing the "Start key" shown in Fig. 16A which closes its respective contacts to enable an impulse transmitted by C3 contacts to be directed to the start relay R2.

VERIFYING X-PUNCHED COLUMNS ON THE CARD AND CORRESPONDING DESIGNATION ON TAPE

In the assumed example, after veryifying card column 14 of the card shown in Fig. 3 and comparison with the corresponding column of the tape in which S is designated, the card carriage spaces to column 15 in which a hole at the X index point position alone initiates a carriage skipping operation. The tape, however, (see Fig. 4) spaces to the next column in which column "figures shift" is designated and as a result of the tape sensing operation the R18 relay is energized in the manner previously described. This results in conditioning the verifying circuits for verification of subsequent numerical data. It will be recalled that during the tape sensing operation the R18 relay is set up, the tape is spaced to the next column to sense the ampersand & or upper case G but no spacing of the card carriage ensues because this is not a verifying operation and the card carriage remains in such position for maintained sensing of card column 15. With the card carriage at column 15, holes are sensed at the 2, 4 and 5 code positions which represent & or upper case G and translating relays R10, R12, R13 are energized to shift their related translating contacts, providing a circuit path to energize R34 distributing relay allocated for the alphabetical character G or &. Relay R34 closes its "a" contacts and a circuit is closed from wire 202 through R34a contacts (Fig. 16A) R18c contacts now transferred to the R7 relay (Fig. 16B). When the card carriage is spaced to card column position 15, the brush 168 of the column readout makes contact with the contact point 167 at such position and the circuit is, therefore, extended from R7 relay, plug connection 320, contact point 167, brush 168, common conducting strip 166 to line 203. R7 relay closes its contacts R7a and a circuit is now closed from line 200 through R7a contacts, wire 321, which as shown in Fig. 16B is joined to one side of the comparison relay RKX, the circuit then extending from the other side of such relay, through reading brush contact 96, R48 relay contacts, cutout contacts 116 to line 203.

When the card carriage spaces to column 15, brush 12 (Fig. 16B) at the X index point position closes the circuit to the RCX relay, through the perforation at such index point position by energizing circuits previously described in detail for other comparison relays. The energization of the RCX relay is effected in the same machine operation that the tape senses the & or upper case G.

Therefore, the RKX relay closes the RKXa contacts (Fig. 16C) now closing the lower verifying circuit to energize the R49 relay. Due to the simultaneous energization of the RKX relay and the RCX relay, the upper verifying circuit is closed to energize the R50 verifying relay. Relay RKX closes supplemental contacts RKXe (Fig. 16C) and a shunt circuit is closed which extends from one side of the R49 relay, wire 322, RKXe contacts, wire 323, R52 relay wire 324, wire 312, to the other side of the R49 relay. R52 relay closes its R52a contacts (Fig. 16C) and a circuit is now closed for the holding coil of the R52 relay extending from line 203, holding coil of R52 relay, R52a contacts, wire 325, through R51a relay contacts now closed in a manner to be explained, wire 315, wire 314, wire 310, latch contacts 35 to the other line side 200. In Fig. 16C, it will be seen that the skip magnet 56 is in shunt with the holding coil of the R52 relay and the skip magnet is now energized. It is assumed that at card column position 15 the skip bar is provided with an X level portion in line with the skip lifter (see Fig. 8) and energization of skip magnet 56 will shift the skip lifter 51 and the carriage will be released for uninterrupted movement to an extent depending upon the length of the X level portion of the skip bar.

Since both verifying relays R49 and R50 are energized upon verification, the circuit previously traced for the escapement magnet 40 is closed to energize the escapement magnet. The latter then operates the stepping dog 46 to release the escapement rack 15. The operation of the stepping dog opens contacts 149 which deenergizes the R51 relay, enabling contacts R51a to close the previously described holding circuit for the holding coil of R52 relay and skip magnet 56. Opening of said floating cam contacts also opens the upper and lower verifying circuits, deenergizing verifying relays R49 and R50.

Relay R52 opens contacts R52b (Fig. 16B bottom) to deenergize the reading brush magnet circuit so that during the period of skipping the brushes are held away from the cards. The holding circuit for the holding coil of the R52 relay maintains the R52b relay contacts open, retaining the reading brush magnet circuit open, insuring the brushes being continuously held away from the card during the duration of skip.

SUPPRESSION OF TAPE FEED DURING THE CARRIAGE SKIPPING OPERATION BY "X" CONTROL

Means is also provided to suppress the tape spacing operation during the skipping of the card carriage under X control of the card and such means is under control of the R7 relay. It will be recalled that this relay is energized under control of the card carriage when it arrives at card column position 15 and is energized when the alphabetical character G or & is sensed on the tape.

Referring now to Fig. 16A, it will be observed that the R7 relay opens the R7b contacts, thereby breaking the holding circuit for the R2 start relay. Upon deenergization of the R2 relay, relay contacts R2b will open, preventing the C1 cam contacts from further transmitting impulses to the latch magnet 263 and tape spacing operations will, therefore, be terminated until card column 24 is reached. In the assumed example, the X level portion of the skip bar enables the card carriage to be skipped to an extent of columns 15 to 23 and the card carriage will be arrested at card column position 24. The stepping dog 47 of the escapement mechanism will come to normal position, shown in Fig. 8, enabling contacts 149 to come to normal closed position and all of the circuits will now be normalized. Restarting of the tape spacing operations is effected when the card carriage reaches card column position 24, at which time a circuit is closed from line 203 through the column readout 165 (Fig. 16B) now at column 24 position, plug connection 327 to one of the "Start" plug hubs. The remainder of the circuit for energizing the "start to read" relay R5 has previously been described and the machine is now conditioned for successive tape sensing operations. Verification of columns 24, 25, 26 now ensue in the manner previously described. After verification of column 26 the tape is spaced to the next column in which a 4 code position is sensed, which designation represents carriage return operations and this will take place in a manner to be subsequently described.

SUPPRESSION OF TAPE FEED DURING CARRIAGE SKIPPING OPERATIONS BY HIGH BAR CONTROL

It is desirable to provide the card sensing machine with a well known form of carriage skipping mechanism which is well known as "high bar control" of carriage skipping operations. This, it will be understood, is an alternative form with regard to the X control carriage skipping operations. Such alternative form is fully shown and described in the patent to H. L. Read, No. 1,962,750, patented June 12, 1934 and shows in Fig. 6 a skip bar provided with an extra high portion 140a which automatically elevates the skip lifter arm and causes the field of the card coextensive therewith to be skipped. With the skip bar 50 of the present machine so modified, it is desirable to suppress tape feeding operations during the skipping of such card field. Assuming that card columns 15 to 23 inclusive are to be skipped under such high bar control, a plug connection (not shown) would be made from column 14 of the readout 165 (Fig. 16B) to one of the plug hubs designated "High bar." At such card column position an obvious circuit will be closed to the R54 relay which opens its R54a contacts (Fig. 16A), thereby deenergizing the start relay R2 to suppress further tape feeding operations. Upon verification of column 14 the carriage spaces to column 15 and the so-called "high bar control" of skipping operations will be now effective to skip the carriage to the number of columns, dependent upon the length of the extra high portion of the bar 50. Resumption of tape feeding is effected by the plug connection 327 refered to in the previous description.

COLUMN CHECKING OPERATIONS

In order to determine whether all functional operations of the tape sensing and card sensing units are completed in unison, so-called column checking circuits are provided. By this arrangement, it can be determined whether or not the card carriage is finally positioned in the column it normally should occupy after completion of the verification of the information on a predetermined section of the perforated tape. This is accomplished by employing a carriage return code signal in the tape which always follows the last item of information in a line punched on the tape representing a message, which position of the tape should be reached when the card carriage occupies a predetermined position. Such card carriage position, in the assumed example, is column 27. In general, the predetermined card column position is the column following the last column of information on the punched card.

Upon sensing the "carriage return" code signal in the tape, the "4" sensing contacts 252 (Fig. 16A) are closed to effect energization of the R12 translating relay. A circuit is then completed upon closure of cam contacts C2 from the line side 200, latch contacts 35, wire 201, said contacts C2, normally closed contacts R9a, R10b, R11d, R12h now transferred, R13o now normal, to the CR distributing relay R43 to line side 203. A holding circuit for this relay is established immediately through its contacts R43h, wire 202, floating cam contacts 149, latch contacts 35 to line side 200. Closure of relay contacts R43a (Fig. 16B) permits a circuit to be closed from the line 200, latch contacts 35, wire 201, said R43a relay contacts now closed, relay coil R55, one of the plug hubs designated "Last column check," plug connection 328, the "27" column conducting segment 167, brushes 168, common conducting strip 166 to the line side 203, energizing said R55 relay. A holding circuit is immediately established from the line 200, latch contacts 35, line 201, and contacts R55a. Obviously, relay R55 could not be picked up at this time if the card carriage rested at any other position than the column "27" position. Upon energization of R55 relay contacts R55b (Fig. 16B) close and R55c open for the following control purposes.

After sensing the "carriage return" code signal, it is remembered that a "line feed" signal follows immediately thereafter (see Fig. 4) which "line feed" signal when sensed, causes the translating relay R10 to be energized through the "2" sensing contacts 252. Upon closure of cam contacts C2 a circuit is closed from line 200, through latch contacts 35, wire 201, C2 contacts, through R9a relay contacts now closed, R10b relay contacts now transferred, thence through normally closed contacts R11c, R12f, R13l to the LF distributing relay R37 to line 203, energizing this relay. The usual distributing relay holding circuit through contacts R37h is immediately established. A circuit is now completed from line 200, latch contacts 35, line 201, through relay contacts R37a (Fig. 16B), transferred relay contacts R55b, coil of relay R4 to line 203. A holding circuit is immediately established through R4d contacts, floating cam contacts 149, latch contacts 35 to line 200.

Opening of contacts R4a (Fig. 16A) breaks the described holding circuit for relay R2 and in turn causes the circuit to the latch magnet 263 to be opened so that further tape sensing and feeding operations are temporarily suspended.

Closure of relay contacts 4c (Fig. 16B) closes a circuit from line side 200 through R4c contacts, wire 329, (Figs. 16B, 16C), release magnet 60 to line 203. This release magnet, as explained in connection with Fig. 6, will free the carriage for uninterrupted movement toward the left to its last column position. Closure of relay contacts R4b (Fig. 16A) also completes the circuit from the line 200 by wire 330 to one side of the escapement magnet 40 (Fig. 16C) and escapement magnet R53, thence from the other side of both through pickup coil of eject relay R56, to line 203. Eject relay R56 controls card ejecting operations which will now be explained.

Pickup coil of R56 relay closes R56a contacts, and when the card carriage arrives at the last column position to close contacts 145 a circuit will be completed from line 200 through last column contacts 145, switch SW2, holding coil of eject relay R56 to line 203. A stick circuit is provided back to line 200 through the R56a stick contacts and contacts 145. Closure of relay contacts R56a also shunts the last column relay R47 across the holding coil of the eject relay R56. R47 relay now transfers R47a contacts (Fig. 16B), opening the brush magnet reading circuit, deenergizing brush magnet 92 and brushes 12 now drop out of contact with the contact roller 91 and concomitantly contacts 95 close and contacts 96 open. Also, when the last column contacts 145 close, a circuit is closed from the line 200, through contacts 145, switch SW2, to the eject magnet 79 to line 203.

Energization of eject magnet 79 will trip the eject fingers of a well known construction (see Shafer Patent No. 2,315,741) gripping the leading edge of the card to flip it over in the eject magazine and the mechanism involved in this operation as is well known will cause closure of the auto start contacts 84 which, in turn, permit the completon of a circuit from line 200, contacts 145, contacts 84, trip magnet 32, contacts 95 to line 203. Energization of trip magnet 32 will cause opening of latch contacts 35 (Fig. 16B) and closure of contacts 36, the contacts 36 completing a circuit from line 200 through contacts 36, wire 331, motor 22 (Fig. 16C), contacts 95 to line 203. Operation of the trip magnet also mechanically trips the driving clutch so that the operation of the motor now advances the next card from the magazine 10 to the sensing position and resets the ejecting fingers in preparation for ejection of the next card.

It is also stated that when the card carriage is skipped to the last column position the floating cam contacts 149 are opened and are held open, as is well known, until the card carriage is in the first column position. Opening of said cam contacts 149 breaks the mentioned holding circuit to said distributing relay R36 and also to the R4 check relay. In this manner, the apparatus is now restored to normal and conditioned for automatic tape sensing and card verifying operations, which operations are effective as described herein upon positioning of the next card to the first column position and the tape to the first column of the next message.

Had the card carriage not been properly positioned to column 27 when the line feed signal is sensed, a circuit will be closed from line 201, through the LF distributing relay contacts R37a (Fig. 16B) normally closed contacts R55c, coil of relay R3 to the line side 203, energizing this relay. Contacts R3a (Fig. 16A) included in the holding circuit for relay R2 are then opened to break this holding circuit and prevent further energization of latch magnet 263.

At the top of Fig. 16C, it will be seen that R3 relay closes its R3b contacts and a circuit is now closed from the line side 200, latch contacts 35, wire 310, R3b relay contacts, R6 error relay, wire 312, R48a relay contacts now closed, contacts 116, to line 203, energizing the relay R6, and causing the error lamp 171 to be illuminated. Thus, it is seen that if tape sensing operations and position of the card carriage are out of harmony, further tape sensing and feeding operations are arrested until such time when the apparatus receives the attention of the operator for correcting the faulty condition.

To manually eject the card, if an error is detected, the machine is provided with a release key 131 which, when depressed, closes its contacts 131a and 131b, (Fig. 16C) closing a circuit from the line side 200 to contacts 131b, release magnet 60 to line 203. A parallel circuit is also established, traceable from line 200, through contacts 131a, escapement magnet 40, the eject relay R56 to line side 203. Both the magnet 40 and eject relay R56, as just described, cause card ejecting operations.

The tape may be spaced out of the tape sensing unit for examination by successive tape feeding operations which are manually initiated by depression of the start key (Fig. 16A) which, through an obvious circuit, energizes the R2 start relay and causes successive tape spacing operations. Therefore, the tape may also be fed for examination when an error in verification is detected or upon failure of harmony in correlated column positions of the tape and card.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A verifying machine for verifying character representations of two records perforated according to two different codes comprising means for analyzing perforations in one column of a record, supplemental means for analyzing perforations in a corresponding column of a supplemental record, character representing setup means under control of the first named analyzing means for representing characters in a code corresponding to the code of perforations on said first named record, means under control of said supplemental analyzing means for translating and converting the character representation on the supplemental record from its code to the code of the first named record, character representing setup means controlled by said translating and converting means for representing characters according to the code of the first named record, and verifying means controlled by both character representing setup means for determining whether the compared records represent like characters.

2. A verifying machine for verifying character representations of two records, one perforated according to the Baudot telegraphic code and the other according to the twelve code position Hollerith code, comprising means for analyzing perforations in one column of said one record, supplemental means for analyzing perforations in a corresponding column of the other record, means under control of the supplemental analyzing means for representing characters according to said twelve code position code, means under control of said first named analyzing means for translating and converting the character representation on the first named record from said Baudot telegraphic code to the twelve code position code, character representing setup means controlled by the translating and converting means to represent characters, and verifying means controlled by both of said character representing setup means for determining whether the compared records represent like characters.

3. A verifying machine for verifying character representations of two records perforated according to two different codes comprising means for analyzing perforations in one column of a record, means for feeding said record column by column, supplemental means for analyzing perforations in a corresponding column of a supplemental record, supplemental means for feeding said supplemental record column by column, means under control of the first named analyzing means for effecting a character representation set up in a code corresponding to the code of perforations on said first named record, means under control of said supplemental analyzing means for translating and converting the character representation on the supplemental record from its code to the code of the first named record to effect a character representing setup according to the code of the first named record, a plurality of character representing setup means, each controlled by the associated means of the two preceding means, verifying means controlled by the plurality of character representing setup means for effecting the operation of both feeding means to feed both records to the next column position when like characters are represented, and means controlled by said verifying means for manifesting a disagreement when unlike characters are represented.

4. A verifying machine for verifying character representations of two records perforated according to two different codes comprising means in one machine for analyzing perforations in one column of a record, supplemental means in a structurally separate machine for analyzing perforations in a corresponding column of a supplemental record, separate feeding means, each in the related machine for feeding the record therein, means including character representing setup means under control of the first named analyzing means for effecting a character representation set up in a code corresponding to the code of perforations on said first named record, means including other character representing setup means under control of said supplemental analyzing means for translating and converting the character representation on the supplemental record from its code to the code of the first named record and for effecting character representing setup according to the code of the first named record, and verifying means controlled by both of the character representing setup means for effecting the concomitant operation of the feeding means in each machine when the associated records represent like characters, and for suppressing the operation of both feeding means when unlike characters are represented and to manifest such disagreement.

5. A verifying machine for verifying character representations of two records perforated according to two different codes comprising means for analyzing perforations in one column of a record, separate means operable concomitantly for feeding said records, means for analyzing perforations in a corresponding column of a supplemental record, means under control of the first named analyzing means and including character representing setup means for effecting a character representation set up in a code corresponding to the code of perforations on said first named record, means including other character representing setup means under control of said supplemental analyzing means for translating and converting the character representation on the supplemental record from its code to the code of the first named record and for effecting a character representing setup according to the code of the first named record, verifying means controlled by both character representing setup means for effecting the operation of both feeding means to concomitantly feed both records to the next column position when like characters are represented, and means controlled by said verifying means for preventing the operation of both record feeding means and for indicating a disagreement when unlike characters are represented.

6. A verifying machine for verifying character representations of two differently coded records comprising, separate means for analyzing the perforations of both records which supposedly represent the same characters in compared columns, but one of which represents certain characters not designated on the other record, means under control of one analyzing means to effect a character setup retained in the code represented by the record analyzed thereby, translating and converting means under control of the other analyzing means to effect a conversion of a coded representation of the characters on the other record to said other retained code and including other means to effect a character representing setup, separate feeding means for said records, means to operate the feeding means for the record representing said certain characters upon analysis thereby by the related analyzing means, and verifying means controlled by the aforesaid character representing setup means to determine whether the character representation is alike for both records.

7. A verifying machine for verifying character representations of two differently coded records, comprising separate means for analyzing the perforations of both records which supposedly represent the same characters in compared columns, but one of which represents in other columns certain characters not designated on the other record, means under control of one analyzing means to effect a character set up retained in the code represented by the record analyzed thereby, translating and converting means under control of the other analyzing means to effect a conversion of a coded representation of the characters on the other record to said other retained code and including other means to effect a character representing setup, separate feeding means for said records, means to operate the feeding means for the record representing said certain characters upon analysis thereby by the related analyzing means, and verifying means controlled by the aforesaid character representing setup means to effect the concomitant operation of both feeding means when the character representation is found to be alike for both records.

8. A verifying machine for verifying character representations of two coded perforated records, comprising separate means for analyzing the perforations of both records which supposedly represent the same characters in compared columns, but one of which represents in some columns certain characters not designated on the other record, separate feeding means for said records, means to operate the feeding means for the record representing said certain characters upon analysis thereby by the related analyzing means, and verifying means controlled by the aforesaid analyzing means to effect the operation of both record feeding means when the character representation is alike for compared columns of both records and for suppressing the operation of both record feeding means and for indicating disagreement when character representation is unlike for compared columns of both records.

9. A verifying machine for verifying character representations of two differently coded perforated records, comprising separate means for analyzing the perforations of both records which supposedly represent the same characters in compared columns, but one of which represents in other columns certain characters not designated on the other record, means under control of one analyzing means to effect a character setup retained in the code represented by the record analyzed thereby, translating and converting means under control of the other analyzing means to effect a conversion of a coded representation of the characters on the record having said certain characters to said retained code and including other setup means to effect a character representing setup in the retained code, separate feeding means for said records, verifying means controlled by both of the aforesaid character representing setup means for determining whether character representation is alike for compared columns of both records, and for effecting the operation of both feeding means upon such determination, and means controlled by said other setup means upon analysis of a column containing perforations representing only said certain characters to prevent the operation of the verifying means and to prevent the operation of the feeding means for only the said other record.

10. In a machine of the class described for verifying characters represented by perforations in successive record columns of a first named record, the combination of a carriage for carrying a perforated record card, means for effecting record card carriage skipping operations for more than one column, separate means for analyzing corresponding columns of the record card and the first named perforated record, separate column feeding means for both said record and said carriage, verifying means under control of said analyzing means for determining whether characters represented by perforations in compared record columns of both said record and said card are alike and upon such determination effecting the operation of both column feeding means, and means operable when said record card carriage has been column fed to a predetermined column position to effect the operation of said record card carriage skipping means and to suppress the operation of the column feeding means of the first named record.

11. In a machine of the class described for verifying characters represented in successive perforated record columns of a first named record, the combination of a carriage carrying a perforated record card, means for effecting record card carriage skipping operations for more than one column, separate means for analyzing a column of said perforated record and a corresponding column of said record card, separate column feeding means for both said record and said carriage, verifying means under control of said analyzing means for determining whether characters represented by perforations in compared record columns of both said record and said card are alike and upon such determination effecting the operation of both column feeding means, means operable when said record card carriage has been column fed to a predetermined column position to suppress the operation of the verifying means and to effect the operation of said record card carriage skipping means and to suppress the operation of the feeding means of the first named record, and means automatically operable when the record card is in such position that another predetermined column of said record card is in analyzing position to initiate the operation of said verifying means to cause verifying operations for said other predetermined column and a compared column of the first named record.

12. In a machine of the class described for verifying characters represented by perforations in successive record columns of a first named record, the combination of a carriage carrying a perforated record card, means for effecting record card carriage skipping operations for more than one column, separate means for analyzing a column of said record card and a corresponding column of the first named perforated record, separate column feeding means for both said record and said carriage, verifying means under control of said analyzing means for determining whether characters represented by perforations in compared record columns of both said record and said card are alike and upon such determination effecting the operation of both column feeding means, and means operable when said record card carriage has been column fed to a predetermined column position to effect the operation of said record card carriage skipping means and to suppress the operation of the column feeding means of the first named record and the operation of the verifying means until another predetermined column of said record card is in analyzing position.

13. A verifying machine for verifying character representations of two records perforated according to two different codes comprising means for analyzing character representing perforations in a column of one record, other means for analyzing character representing perforations in a corresponding column of another record, means under control of said other analyzing means for translating and converting the character representation on said other record from its code to the code of the one record to effect a character representing setup according to the code of the first named record, and verifying means controlled by the translating and converting means and the analyzing means for the first named record for determining whether the compared records represent like characters.

14. A verifying machine for verifying character representations of two records perforated according to two different codes comprising means for analyzing character representing perforations in a column of one record, other means for analyzing character representing perforations in a corresponding column of another record, means under control of said other analyzing means for translating and converting the character representation on said other record from its code to the code of the one record to effect a character representing setup according to the code of the first named record, and verifying means controlled by the translating and converting means and the analyzing means for the first named record for determining whether the compared records represent like characters, separate means for feeding each record column by column, and means controlled by said verifying means for effecting the operation of both feeding means to feed both records to the next column position when like characters are represented, and for manifesting a disagreement when unlike characters are represented.

CHARLES R. DOTY.

REFERENCES CITED

The following references are of record in the file of this patent:

UNITED STATES PATENTS

| Number | Name | Date |
| --- | --- | --- |
| 1,591,005 | Stuivenberg | June 29, 1926 |
| 1,945,643 | Krell | Feb. 6, 1934 |
| 2,094,010 | Hartley | Sept. 28, 1937 |
| 2,224,764 | Dickinson et al. | Dec. 10, 1940 |
| 2,314,679 | Bailey et al. | Mar. 23, 1943 |